US010354574B2

(12) United States Patent
Kobayashi et al.

(10) Patent No.: US 10,354,574 B2
(45) Date of Patent: Jul. 16, 2019

(54) DRIVER IC AND ELECTRONIC DEVICE

(71) Applicant: Semiconductor Energy Laboratory Co., Ltd., Atsugi-shi, Kanagawa-ken (JP)

(72) Inventors: Hidetomo Kobayashi, Kanagawa (JP); Kei Takahashi, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 182 days.

(21) Appl. No.: 15/263,453

(22) Filed: Sep. 13, 2016

(65) Prior Publication Data

US 2017/0092177 A1 Mar. 30, 2017

(30) Foreign Application Priority Data

Sep. 25, 2015 (JP) ................................. 2015-188757

(51) Int. Cl.
*G09G 3/20* (2006.01)
*G09G 3/36* (2006.01)
*G09G 3/3233* (2016.01)

(52) U.S. Cl.
CPC ......... *G09G 3/2018* (2013.01); *G09G 3/2074* (2013.01); *G09G 3/3233* (2013.01);
(Continued)

(58) Field of Classification Search
None
See application file for complete search history.

(56) References Cited

U.S. PATENT DOCUMENTS

| 7,248,235 B2 | 7/2007 | Fujii et al. |
| 8,094,107 B2 | 1/2012 | Nishimura et al. |

(Continued)

FOREIGN PATENT DOCUMENTS

| CN | 101273396 A | 9/2008 |
| CN | 101427296 A | 5/2009 |

(Continued)

OTHER PUBLICATIONS

International Search Report (Application No. PCT/IB2016/055477) dated Dec. 20, 2016.

(Continued)

*Primary Examiner* — Gustavo Polo
(74) *Attorney, Agent, or Firm* — Fish & Richardson P.C.

(57) ABSTRACT

To achieve versatility, a driver IC has a function of generating an analog data signal from an image signal input from the outside; a function of outputting the analog data signal from an output pin; and a function of setting the analog data signal as a data signal for alternating-current driving or for direct-current driving, in accordance with data of a digital signal input from the outside. For example, the driver IC can output data signals for alternating-current driving from output pins in odd-numbered columns and data signals for direct-current driving from output pins in even-numbered columns. Furthermore, the driver IC can output data signals for alternating-current driving or for direct-current driving from all the output pins. The driver IC can drive a liquid crystal panel, a self-luminous panel, and a hybrid display panel where one subpixel includes a liquid crystal element and a light-emitting element.

16 Claims, 26 Drawing Sheets

(52) U.S. Cl.
CPC ... *G09G 3/3611* (2013.01); *G09G 2300/0426* (2013.01); *G09G 2300/0452* (2013.01); *G09G 2310/0286* (2013.01); *G09G 2310/0291* (2013.01)

(56) References Cited

U.S. PATENT DOCUMENTS

| | | | |
|---|---|---|---|
| 8,149,190 B2 | 4/2012 | Mizukoshi et al. | |
| 2002/0011978 A1 | 1/2002 | Yamazaki et al. | |
| 2003/0193457 A1 | 10/2003 | Wang et al. | |
| 2006/0072047 A1 | 4/2006 | Sekiguchi | |
| 2007/0075935 A1 | 4/2007 | Mesmer et al. | |
| 2007/0080905 A1* | 4/2007 | Takahara | G09G 3/3233 345/76 |
| 2007/0139327 A1* | 6/2007 | Liu | G09G 3/3614 345/89 |
| 2009/0146913 A1 | 6/2009 | Tanabe | |
| 2009/0231241 A1 | 9/2009 | Abe | |
| 2010/0207967 A1 | 8/2010 | Baek et al. | |

FOREIGN PATENT DOCUMENTS

| | | |
|---|---|---|
| DE | 112006002393 | 7/2008 |
| EP | 2016579 A | 1/2009 |
| JP | 2002-062856 A | 2/2002 |
| JP | 2003-140618 A | 5/2003 |
| JP | 2003-157026 A | 5/2003 |
| JP | 2003-316295 A | 11/2003 |
| JP | 2007-286525 A | 11/2007 |
| JP | 2008-090276 A | 4/2008 |
| JP | 2009-223070 A | 10/2009 |
| JP | 2015-161752 A | 9/2015 |
| KR | 2008-0039530 A | 5/2008 |
| KR | 2009-0013811 A | 2/2009 |
| KR | 2010-0092558 A | 8/2010 |
| TW | 544944 | 8/2003 |
| TW | 201035959 | 10/2010 |
| WO | WO-2004/053819 | 6/2004 |
| WO | WO-2007/007918 | 1/2007 |
| WO | WO-2007/041150 | 4/2007 |
| WO | WO-2008/029717 | 3/2008 |

OTHER PUBLICATIONS

Written Opinion (Application No. PCT/IB2016/055477) dated Dec. 20, 2016.

* cited by examiner

FIG. 5A
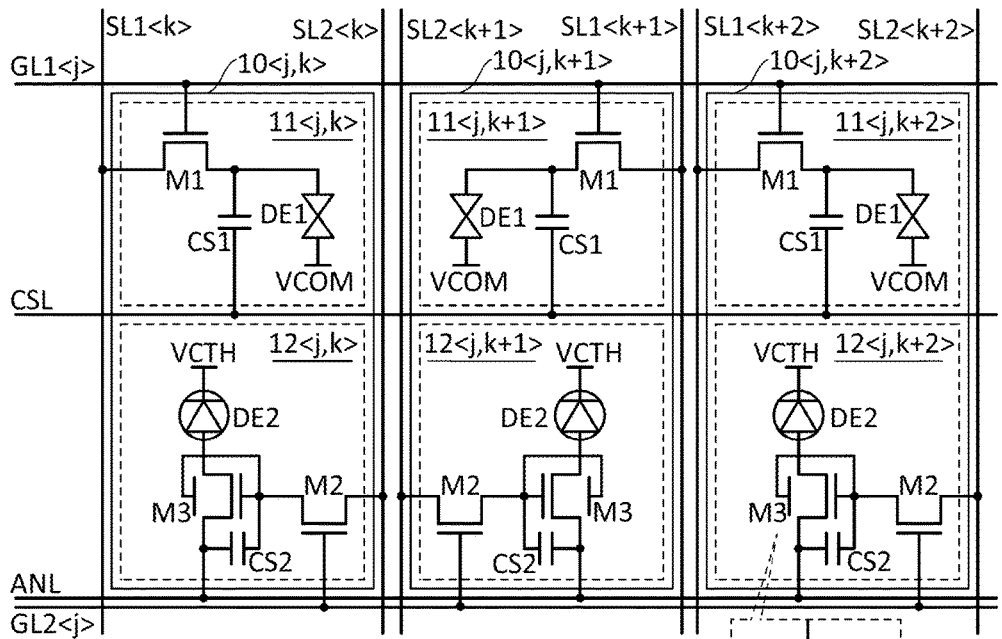
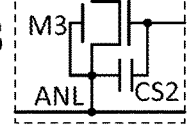
FIG. 5B
FIG. 5C
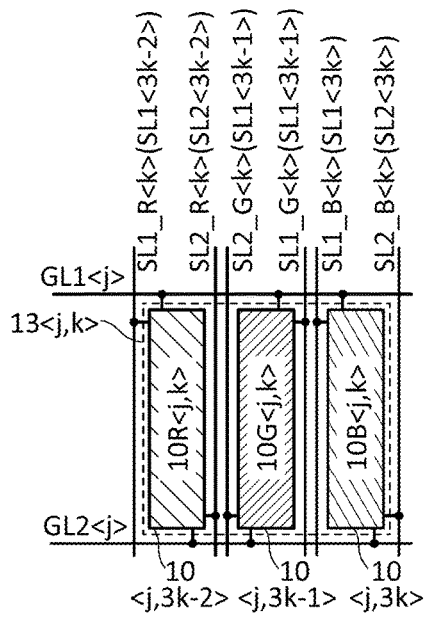
FIG. 5D
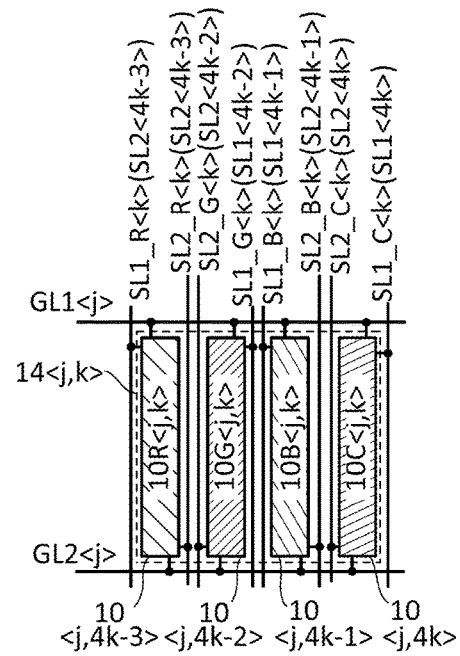

SOURCE DRIVER IC 200

DRIVER IC AND ELECTRONIC DEVICE

BACKGROUND OF THE INVENTION

1. Field of the Invention

One embodiment of the present invention belongs to a technical field of display devices, and relates to a driver circuit of a display device and a method for driving a display device, for example. Note that the technical field shown here is an example, and a technical field to which one embodiment of the present invention can be applied is not limited to the above.

2. Description of the Related Art

To meet demand for multiple gray levels, higher definition, and the like of an active-matrix display device, a dedicated IC (a driver IC) is used as a driver circuit of an active-matrix display device, particularly as a source driver for generating a data signal from a video signal. For example, Patent Document 1 discloses a driver IC for a liquid crystal display device, and Patent Document 2 discloses a driver IC for an electroluminescent (EL) display device.

A hybrid display device where a liquid crystal element and a light-emitting element are provided in one subpixel has been suggested (e.g., see Patent Documents 3 to 5).

PATENT DOCUMENT

Patent Document 1: Japanese Published Patent Application No. 2007-286525
Patent Document 2: Japanese Published Patent Application No. 2009-223070
Patent Document 3: Japanese Published Patent Application No. 2003-157026
Patent Document 4: PCT International Publication No. WO2004/053819
Patent Document 5: PCT International Publication No. WO2007/041150

SUMMARY OF THE INVENTION

A reflective liquid crystal display device consumes less power because it does not require a backlight, but can display images favorably only in a place where bright external light is obtained (e.g., bright outdoors and illuminated indoors). An EL display device, which includes a self-luminous EL element, can display images favorably in a dark place; however, its visibility is lowered in a bright place. The hybrid display devices disclosed in Patent Documents 3 to 5 take advantages of a reflective liquid crystal display device and an EL display device and can be used regardless of brightness of a place where they are used.

As described in Patent Document 3 and the like, a driving method is different between a liquid crystal display device and an EL display device. In a liquid crystal display device, a liquid crystal (LC) element needs to be driven with alternating current in order to prevent burn-in of liquid crystal. In an EL display, an EL element is driven with direct current, and the luminance of the EL element is controlled by adjusting the amount of current between the anode and cathode of the EL element.

Thus, in a hybrid display device, a data signal for an LC element and a data signal for an EL element need to be produced from one gray level data. A simple way of resolving this issue is to use a source driver IC for a liquid crystal display device and a source driver IC for an EL display device. However, this scheme prevents the reduction in size, weight, and thickness of a hybrid display device. Moreover, the use of two kinds of source driver ICs results in higher cost.

In view of the above, an object of one embodiment of the present invention is to provide a novel circuit for driving a display device, to provide a novel display device, or to provide a novel method for driving a display device. Another object of one embodiment of the present invention is to provide a versatile driver or to prevent the increase in size, weight, thickness, or cost of a display device.

Note that the description of a plurality of objects does not preclude the existence of each object. One embodiment of the present invention does not necessarily achieve all the objects. Objects other than those listed above are apparent from the description of the specification, drawings, and claims (hereinafter collectively referred to as "this specification and the like"), and such objects could be an object of one embodiment of the present invention.

(1) One embodiment of the present invention is a driver IC with a function of driving a source line. The driver IC includes an output pin. The driver IC has a function of generating an analog data signal from an image signal input from the outside; a function of outputting the analog data signal from the output pin; and a function of setting whether the analog data signal output from the output pin is output as an alternating-current voltage signal or a direct-current voltage signal, in accordance with data of a digital signal input from the outside.

(2) One embodiment of the present invention is a driver IC including a first output pin and a second output pin. A digital signal is input from the outside. The digital signal can include at least first data, second data, and third data. The driver IC has a function of generating a first analog data signal from an image signal input from the outside, and a function of generating a second analog data signal from the image signal. The driver IC has a function of outputting the first analog data signal from the first output pin as an alternating-current voltage signal and outputting the second analog data signal from the second output pin as a direct-current voltage signal, when the data of the digital signal is the first data. The driver IC has a function of outputting the first analog data signal from the first output pin as an alternating-current voltage signal and outputting the second analog data signal from the second output pin as an alternating-current voltage signal, when the data of the digital signal is the second data. The driver IC has a function of outputting the first analog data signal from the first output pin as a direct-current voltage signal and outputting the second analog data signal from the second output pin as a direct-current voltage signal, when the data of the digital signal is the third data.

(3) One embodiment of the present invention is a driver IC including a first output pin, a second output pin, a logic circuit, a shift register, a latch circuit, a digital-to-analog converter circuit, a multiplexer, and an amplifier circuit. The logic circuit has a function of generating first to third control signals, and a function of generating a first digital data signal and a second digital data signal from an image signal input from the outside. The latch circuit has a function of latching the first digital data signal and the second digital data signal in accordance with an output signal of the shift register, and a function of outputting the first digital data signal and the second digital data signal in accordance with the first control signal. The digital-to-analog converter circuit has a function of generating a first pair of analog data signals composed of a positive signal and a negative signal in accordance with data of the first digital data signal, and function of generating a second pair of analog data signals composed of a positive signal and a negative signal in accordance with data of the second digital data signal. The multiplexer has a function of outputting one signal of the first pair of analog data signals to the amplifier circuit in accordance with data of the second control signal, and a function of outputting one signal of the second pair of analog data signals to the amplifier circuit in accordance with data of the third control signal. The amplifier circuit has a function of amplifying the one signal of the first pair of analog data signals output from the multiplexer and output the amplified signal to the first output pin, and a function of amplifying the one signal of the second pair of analog data signals output from the multiplexer and output the amplified signal to the second output pin.

(4) One embodiment of the present invention is an electronic device including a display panel and a source driver. The source driver is electrically connected to the display panel. The source driver includes one or a plurality of the driver ICs according to any of the above embodiments (1) to (3).

In this specification and the like, a semiconductor device refers to a device that utilizes semiconductor characteristics, and means a circuit including a semiconductor element (e.g., a transistor, a diode, or a photodiode), a device including the circuit, and the like. A semiconductor device also means any device that can function by utilizing semiconductor characteristics. An integrated circuit, a chip including an integrated circuit, and an electronic component including a chip in a package are examples of semiconductor devices. Moreover, a memory device, a display device, a light-emitting device, a lighting device, an electronic device, and the like themselves may be semiconductor devices or may each include a semiconductor device.

In this specification and the like, the description "X and Y are connected" means that X and Y are electrically connected, X and Y are functionally connected, and X and Y are directly connected. Accordingly, another element may be provided between elements having a connection relation shown in drawings and texts, without being limited to a predetermined connection relation, for example, the connection relation shown in the drawings and texts. Each of X and Y denotes an object (e.g., a device, an element, a circuit, a wiring, an electrode, a terminal, a conductive film, or a layer).

A transistor is an element having three terminals: a gate, a source, and a drain. A gate is a node that controls the conduction state of a transistor. Depending on the type of a transistor or levels of potentials applied to the terminals, one of two input/output nodes functions as a source and the other functions as a drain. Therefore, the terms "source" and "drain" can be replaced with each other in this specification and the like. In this specification and the like, two terminals except a gate are sometimes referred to as a first terminal and a second terminal or as a third terminal and a fourth terminal, for example.

A node can be referred to as a terminal, a wiring, an electrode, a conductive layer, a conductor, an impurity region, or the like depending on a circuit configuration, a device structure, and the like. Furthermore, a terminal, a wiring, or the like can be referred to as a node.

A voltage usually refers to a difference in potential between a given potential and a reference potential (e.g., a ground potential (GND) or a source potential). Thus, a voltage can be referred to as a potential. Note that a potential has a relative value. Hence, "GND" does not necessarily mean 0 V.

In this specification and the like, ordinal numbers such as "first," "second," and "third" are used to show the order in some cases. Alternatively, ordinal numbers are used to avoid confusion among components in some cases, and do not limit the number or order of the components. For example, it is possible to replace the term "first" with the term "second" or "third" in describing one embodiment of the present invention.

One embodiment of the present invention can provide a novel circuit for driving a display device, provide a novel display device, or provide a novel method for driving a display device. Alternatively, one embodiment of the present invention can provide a versatile driver or prevent the increase in size, weight, thickness, or cost of a display device.

The description of the plurality of effects does not preclude the existence of other effects. One embodiment of the present invention does not necessarily achieve all the effects described above. In one embodiment of the present invention, an object other than the above objects, an effect other than the above effects, and a novel feature will be apparent from the description of the specification and the drawings.

BRIEF DESCRIPTION OF THE DRAWINGS

In the accompanying drawings:

FIGS. 5A to 5D are circuit diagrams each illustrating a structure example of a pixel portion;

DETAILED DESCRIPTION OF THE INVENTION

Figure 1:
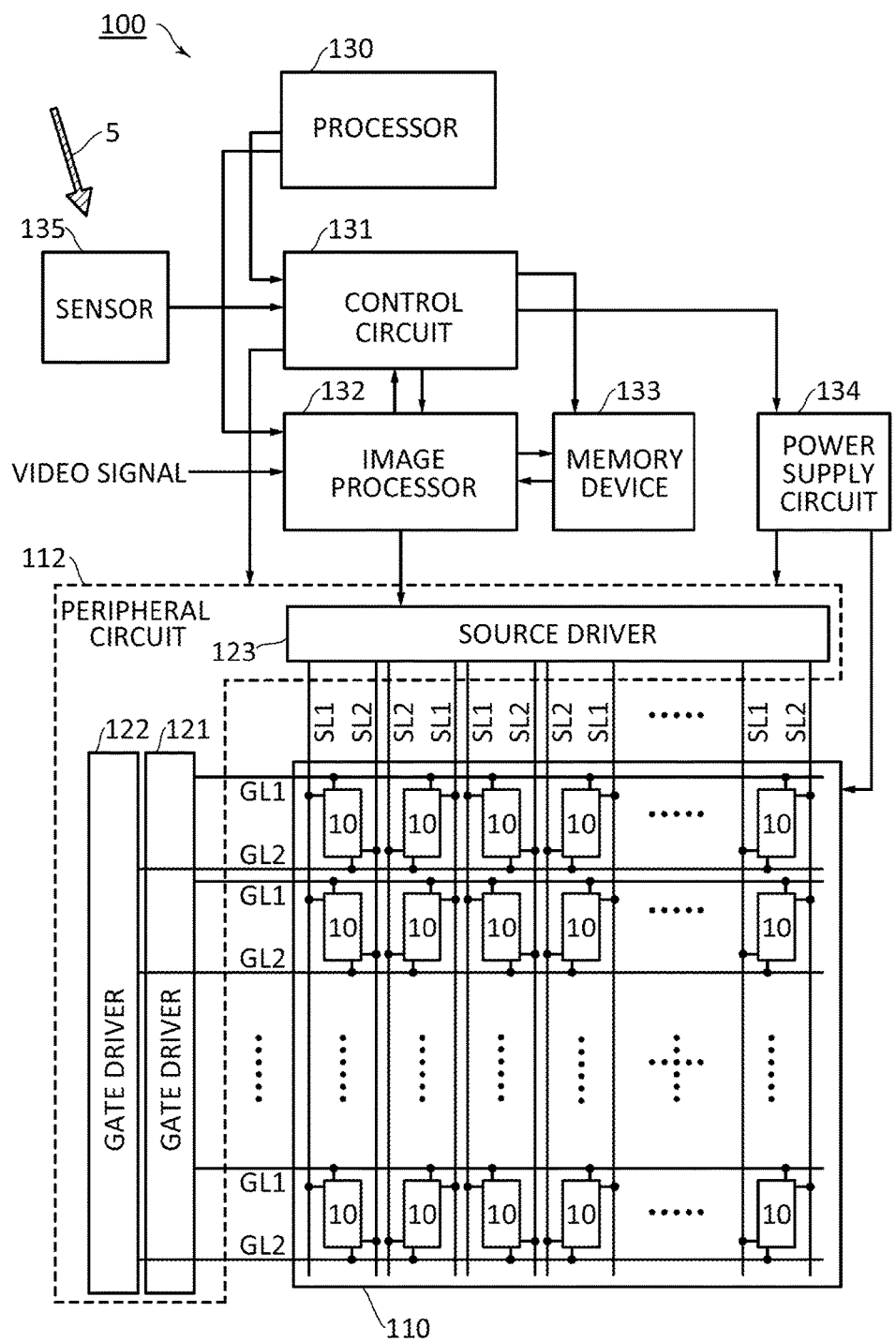
FIG. 1 illustrates a structure example of a display device.

Note that in this specification, terms for describing arrangement, such as "over" and "under," are sometimes used for convenience to describe the positional relation between components with reference to drawings. Furthermore, the positional relation between components is changed as appropriate in accordance with a direction in which each component is described. Thus, the positional relation is not limited by a term used in the specification and can be described with another term as appropriate depending on the situation.

Note that in this specification and the like, the terms "film" and "layer" can be interchanged depending on the case or circumstances. For example, in some cases, the term "conductive film" can be used instead of the term "conductive layer," and the term "insulating layer" can be used instead of the term "insulating film."

In the drawings, the same components, components having similar functions, components formed using the same material, or components formed at the same time are sometimes denoted by the same reference numerals, and description thereof is not repeated in some cases.

Embodiments of the present invention will be described below. Note that one embodiment of the present invention is not limited to the following description. It will be readily appreciated by those skilled in the art that modes and details of the present invention can be modified in various ways without departing from the spirit and scope of the present invention. One embodiment of the present invention therefore should not be construed as being limited to the following description of the embodiments.

Any of the embodiments described below can be combined as appropriate. In addition, in the case where some structure examples (including a manufacturing method, an operating method, and the like) are given in one embodiment, any of the structure examples can be combined as appropriate, and any of the structure examples can be combined with one or more structure examples described in the other embodiments.

Embodiment 1

Here, a hybrid display device in which a liquid crystal element and a light-emitting element are provided in one subpixel will be described.

<<Display Device>>

FIG. 1 is a block diagram illustrating a structure example of a display device. A display device 100 includes a pixel portion 110, a peripheral circuit 112, a processor 130, a control circuit 131, an image processor 132, a memory device 133, a power supply circuit 134, and a sensor 135.

The processor 130 is a circuit for executing an instruction and controlling the display device 100 collectively. For the processor 130, various kinds of processors such as a CPU and MPU can be used. When the display device 100 is incorporated into an electronic device as an electronic component that constitutes a display portion, the processor 130 may be a processor of the electronic device (host device).

The processor 130 executes an instruction input from the outside and an instruction stored in an internal memory. The processor 130 generates signals for controlling the control circuit 131 and the image processor 132. The control circuit 131 controls the operation of the display device 100 on the basis of a control signal from the processor 130, a sensing signal from the sensor 135, or the like. The control circuit 131 controls the peripheral circuit 112, the image processor 132, the power supply circuit 134, and the memory device 133 so that processing determined by the processor 130 is executed. To the control circuit 131, a variety of synchronization signals that determine timing of updating the screen are input, for example. Examples of the synchronization signals include a horizontal synchronization signal, a vertical synchronization signal, and a reference clock signal. The control circuit 131 generates a control signal for the peripheral circuit 112 from these signals.

In the display device 100, screen brightness can be adjusted and a display mode (display using EL elements or display using LC elements) can be changed, for example, in response to brightness of usage environment. The sensor 135 is provided to perform such operation. The sensor 135 includes an optical sensor that senses external light 5 and generates a sensing signal. The control circuit 131 generates control signals for the peripheral circuit 112 and the image processor 132 on the basis of a sensing signal. For example, the sensor 135 can be an illuminance sensor that senses illumination. The image processor 132 can execute signal processing corresponding to a sensing signal of the sensor 135; thus, for example, the image processor 132 can set gray level data of an image signal corresponding to illuminance. Note that a sensing signal of the sensor 135 may be input to the processor 130 or input to the image processor 132.

The power supply circuit 134 has a function of supplying power supply voltage to the pixel portion 110 and the peripheral circuit 112.

The pixel portion 110 includes a plurality of subpixels 10 and a plurality of wirings GL1, SL1, GL2, and SL2. The plurality of subpixels 10 are arranged in an array. The plurality of wirings GL1, SL1, GL2, and SL2 are provided in accordance with the arrangement of the plurality of subpixels 10. Each subpixel 10 includes an LC element and an EL element, and is electrically connected to the wirings GL1 and GL2 in a corresponding row and the wirings SL1 and SL2 in a corresponding column. The wirings GL1 and SL1 are wirings for driving the LC element. The wirings GL2 and SL2 are wirings for driving the EL element. The wirings GL1 and GL2 can be referred to as a gate line, a scan line, a selection signal line, or the like. The wirings SL1 and SL2 can be referred to as a source line, a data line, a data signal line, or the like.

The peripheral circuit 112 functions as a driver for driving the pixel portion 110. The peripheral circuit 112 includes gate drivers 121 and 122 and a source driver 123. The gate driver 121 is a circuit for driving the wiring GL1 and has a function of generating a signal supplied to the wiring GL1.

The gate driver 122 is a circuit for driving the wiring GL2 and has a function of generating a signal supplied to the wiring GL2. The source driver 123 is a circuit for driving the wirings SL1 and SL2 and has a function of generating a signal supplied to the wirings SL1 and SL2.

The image processor 132 has a function of processing a video signal input from the outside and generating an image signal to be processed by the source driver 123. An image signal is a digital signal with gray level data. The image processor 132 has a function of correcting an image signal. The source driver 123 has a function of processing an image signal and generating a data signal supplied to the wirings SL1 and SL2.

The memory device 133 is provided to store data necessary to execute processing by the image processor 132. The memory device 133 stores an image signal and a video signal input from the outside, for example.

Figure 2:
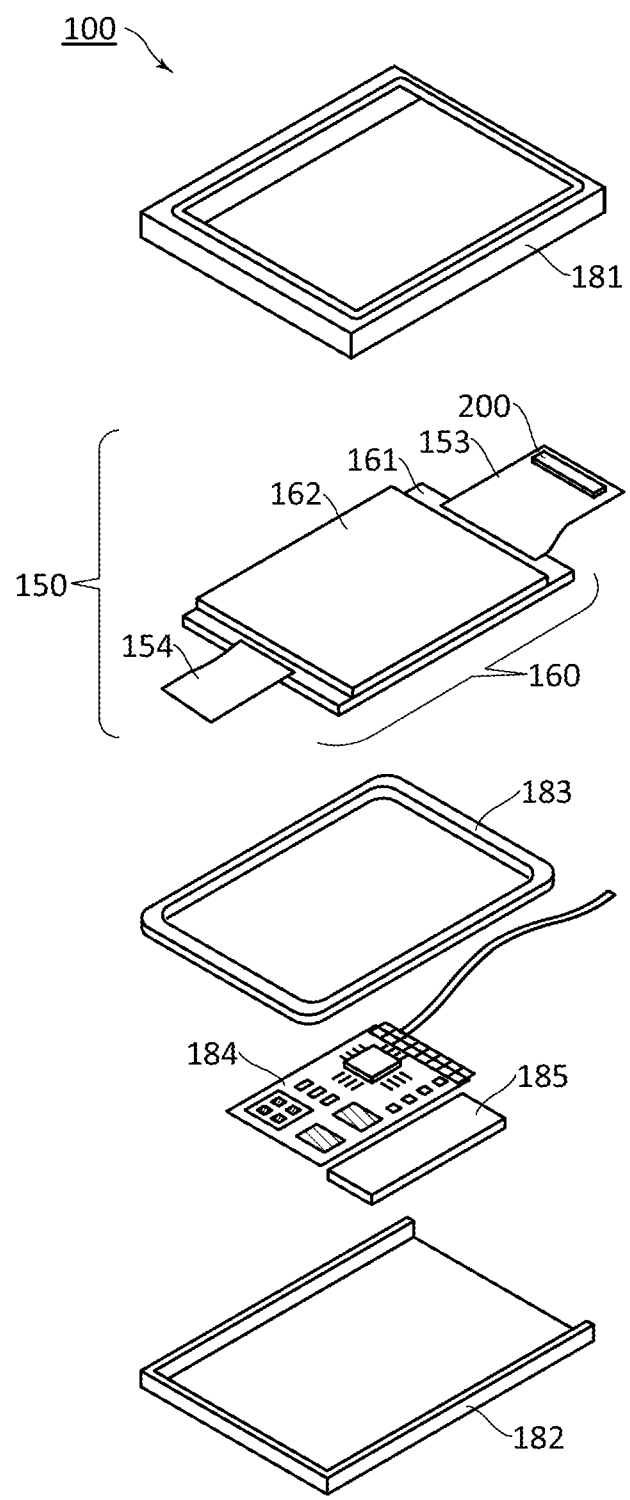
FIG. 2 is an exploded perspective view illustrating a structure example of a display device.

FIG. 2 is an exploded perspective view illustrating a structure example of the display device 100. The display device 100 includes various components between an upper cover 181 and a lower cover 182. In the example of FIG. 2, the display device 100 includes a display module 150, a frame 183, a printed circuit board 184, and a battery 185. The frame 183, the battery 185, or the like may be omitted in some cases. The display device 100 may be provided with a lighting device that illuminates a display panel 160 (e.g., a front light unit).

Over the printed circuit board 184, circuits other than the pixel portion 110 and the peripheral circuit 112 can be provided. For example, the processor 130, the control circuit 131, the image processor 132, the memory device 133, and the power supply circuit 134 can be provided over the printed circuit board 184. As a power source for supplying power to the power supply circuit 134, an external commercial power source or the battery 185 may be used.

The frame 183 has a function of protecting the display panel 160 and a function of an electromagnetic shield for blocking electromagnetic waves generated at the printed circuit board 184. The frame 183 may also have a function of a radiator plate. The shape and size of the upper cover 181 can be changed as appropriate in accordance with the size of the display panel 160. The same applies to the lower cover 182 and the frame 183.

(Display Module)

The display module 150 includes a source driver IC 200, flexible printed circuits (FPCs) 153 and 154, and the display panel 160. The display panel 160 includes substrates 161 and 162. The pixel portion 110 and the gate drivers 121 and 122 are provided between the substrate 161 and the substrate 162. The source driver 123 is incorporated into the source driver IC 200. The FPC 153 is electrically connected to a terminal portion of the display panel 160, and the FPC 154 is electrically connected to another terminal portion. The source driver IC 200 is electrically connected to the FPC 153. The source driver IC 200 is electrically connected to external circuits (e.g., the control circuit 131, the image processor 132, and the power supply circuit 134) through the FPC 153. The pixel portion 110 and the gate drivers 121 and 122 are electrically connected to external circuits (e.g., the control circuit 131 and the power supply circuit 134) through the FPC 154.

Figure 3:
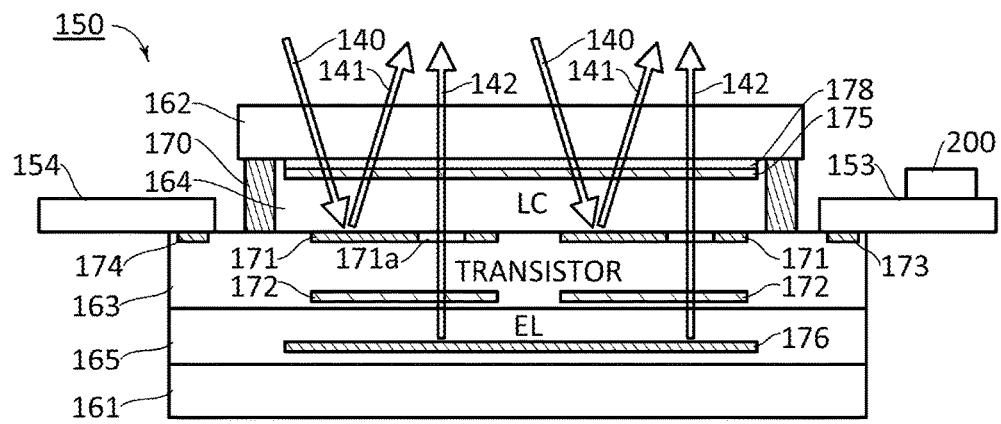
FIG. 3 is a schematic diagram illustrating a structure example of a display module.

FIG. 3 is a cross-sectional view for showing the structure of the display module 150 briefly. The display module 150 includes a transistor layer 163, an LC layer 164, and an EL element layer 165 between the substrate 161 and the substrate 162. The LC layer 164 is placed in a gap provided by a sealing material 170 between the substrate 162 and the transistor layer 163.

The transistor layer 163 is a layer where various elements included in the pixel portion 110 and the gate drivers 121 and 122 are provided. Examples of these elements are a transistor, a capacitor, a rectifier element, and a resistor. In the transistor layer 163, a pixel electrode 171, a pixel electrode 172, and terminal portions 173 and 174 are provided. The pixel electrode 171 is a pixel electrode for LC and is a reflective electrode. Accordingly, the pixel electrode 171 has an opening 171a to extract light from the EL element. The pixel electrode 172 is a pixel electrode for EL and is a transmissive electrode through which light is transmitted.

The substrate 162 is provided with a common electrode 175, a color filter 178, and the like. In the EL element layer 165, an EL layer, a common electrode 176, and the like are provided. The common electrode 175 is a common electrode for LC and is a transmissive electrode. The common electrode 176 is a common electrode for EL and is a reflective electrode.

The display module 150 is a hybrid display module that has functions of both a reflective LC display module using external light and an EL display module using light emission of EL elements (a self-luminous display module). External light 140 is incident from the substrate 162, transmitted through the color filter 178, the common electrode 175, and the LC layer 164, and reflected by the pixel electrode 171. Light 141 reflected by the pixel electrode 171 passes through the LC layer 164, the common electrode 175, and the color filter 178 and is emitted from the substrate 162. The luminance of the light 141 is determined by a potential difference between the pixel electrode 171 and the common electrode 175. Light 142 is generated in the EL element layer 165. The luminance of the light 142 is determined by a current flowing through the EL element layer 165. The light 142 is reflected by the common electrode 176, passes through the opening 171a in the pixel electrode 171, is transmitted through the LC layer 164, the common electrode 175, and the color filter 178, and is extracted from the substrate 162.

For the substrate 162, an optical film (e.g., a polarizing film, a retardation film, a prism sheet, or an anti-reflection film) or the like may be provided on a surface on which the external light 140 is incident.

Figure 4A:
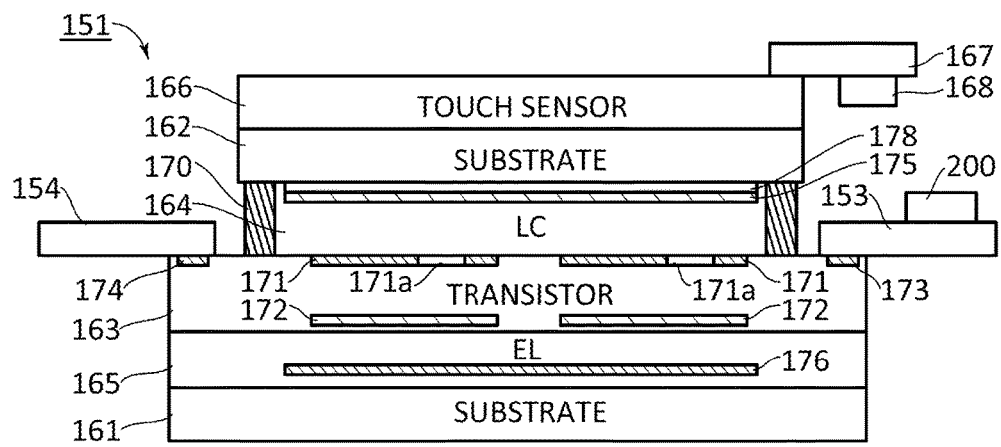
FIGS. 4A and 4B are schematic diagrams each illustrating a structure example of a display module (a touch panel module)
Figure 4B:
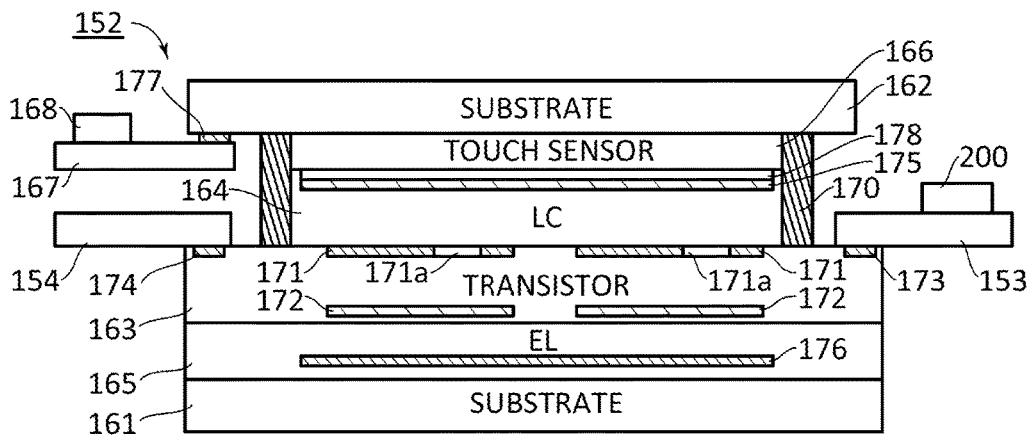

The display module 150 may be provided with a touch sensor. Some examples are shown in FIGS. 4A and 4B. A display module 151 illustrated in FIG. 4A is an electronic component in which the display module 150 is provided with an on-cell touch panel. A display module 152 illustrated in FIG. 4B is an electronic component in which the display module 150 is provided with an in-cell touch panel. The display modules 151 and 152 can be referred to as a touch panel module.

The display module 151 includes a touch sensor 166, an FPC 167, and a touch sensor driver IC 168. The touch sensor 166 is provided on an outer surface of the substrate 162 (a surface from which the light 141 and the light 142 are extracted).

As the touch sensor 166, a resistive touch sensor, a capacitive touch sensor, or the like can be used. The touch sensor driver IC 168 has a function of driving the touch sensor 166. The touch sensor driver IC 168 is electrically connected to the FPC 167. The FPC 167 is electrically connected to a terminal portion of the touch sensor 166.

The display module 152 includes the FPC 167, the touch sensor driver IC 168, the touch sensor 166, and a terminal 177. The touch sensor 166 is provided between the substrate 162 and the common electrode 175. The terminal 177 is formed on the substrate 162 during the process of fabricating the touch sensor 166. The touch sensor 166 is electrically connected to the touch sensor driver IC 168 through the terminal 177 and the FPC 167.

In FIG. 3 and FIGS. 4A and 4B, the source driver IC 200 is mounted by a chip on flexible (COF) method; however, there is no particular limitation on the mounting method, and a chip on glass (COG) method or a tape automated bonding (TAB) method may be employed. The same applies to the touch sensor driver IC 168.

The substrate 161 is different from a support substrate (e.g., a glass substrate or a quartz substrate) used for forming the transistor layer 163 and the EL element layer 165. After or while the transistor layer 163 and the EL element layer 165 are formed, the support substrate is separated, and the substrate 161 is attached to the EL element layer 165 by a bonding layer. Separating the support substrate allows exposure of a terminal connected to the FPC 153 and a terminal connected to the FPC 154.

When the substrates 161 and 162 are flexible substrate, a flexible display panel 160 is obtained. Using the flexible display panel 160 for a display portion makes it possible to provide an electronic device capable of being used while a screen is bent.

Examples of a substrate that can be used as the substrates 161 and 162 in the display panel 160 include a glass substrate, a quartz substrate, a plastic substrate, a metal substrate, a stainless steel substrate, a substrate containing stainless steel foil, a tungsten substrate, a substrate containing tungsten foil, a flexible substrate, a laminate film, paper containing a fibrous material, and a base film. Examples of a glass substrate include a barium borosilicate glass substrate, an aluminoborosilicate glass substrate, and a soda lime glass substrate. Examples of a flexible substrate include flexible synthetic resin substrates made of plastics typified by polyethylene terephthalate (PET), polyethylene naphthalate (PEN), and polyether sulfone (PES), or acrylic. Examples of a laminate film are a film made of polypropylene, polyester, polyvinyl fluoride, polyvinyl chloride, or the like, and an inorganic film formed by evaporation. Examples of a base film are base films formed using a polyester resin, a polyamide resin, a polyimide resin, an aramid resin, an epoxy resin, and paper.

A substrate (including a film) that can be used as the substrate 161 needs a function of supporting the transistor layer 163 and the EL element layer 165, a function of protecting the EL element layer 165, and the like. A substrate (including a film) that can be used as the substrate 162 needs a function of transmitting visible light, a function of sealing the LC layer 164, and the like. For example, an optical film (circular polarizer film) can be used as the substrate 162. In this case, the weight and thickness of the display module 150 can be reduced compared to the case where an optical film is fixed to the substrate 162.

In the display module 150 illustrated in FIG. 3, the pixel portion 110 can be constituted by one transistor layer 163. Thus, the source driver 123 is not necessarily composed of a driver IC for LC and a driver IC for EL, and the source lines (SL1) for LC and the source lines (SL2) for EL can be driven with one type of the source driver IC 200. A source driver IC having such a function will be described below.

(Pixel Portion 110)

Before explanation of examples of the structure and operation of the source driver IC, the circuit configuration of the pixel portion 110 will be described. FIG. 5A illustrates an example of the circuit configuration of the pixel portion 110. FIG. 5A specifically illustrates three subpixels 10 arranged in one row and three columns. A subpixel 10<j,k> represents the subpixel 10 in the j-th row and the k-th column. A wiring GL1<j> represents the wiring GL1 in the j-th row. The wiring SL2<k> represents the wiring SL2 in the k-th column. Note that j and k are each an integer larger than 1.

The subpixel 10 includes subpixels 11 and 12. The subpixel 11 is for the LC display panel and includes a transistor M1, a capacitor CS1, and an LC element DE1. The subpixel 11 is electrically connected to the wirings GL1 and SL1 and a wiring CSL. The wiring CSL is common to all the subpixels 11 in the pixel portion 110 and is electrically connected to the capacitor CS1 in each subpixel 11. VCOM is a voltage input to a common electrode of the LC element DE1.

Here, the subpixel 11 is a pixel that has the same configuration as a subpixel of a reflective liquid crystal display panel; however, the configuration of the subpixel 11 is not limited to this and can be any configuration as long as display is possible using external light. For example, instead of the LC element DE1, a display element using electrophoresis, particle movement, or particle rotation may be provided in the subpixel 11.

The subpixel 12 is for the EL display panel and includes transistors M2 and M3, a capacitor CS2, and an EL element DE2. The subpixel 12 is electrically connected to the wirings GL2 and SL2 and a wiring ANL. The wiring ANL is common to all the subpixels 12 in the pixel portion 110 and is electrically connected to the capacitor CS2 in each subpixel 12. VCTH is a voltage of a common electrode (here, a cathode) of the EL element DE2 and is a common voltage of the subpixel 12. The wiring ANL is supplied with a voltage higher than VCTH.

The transistor M2 is referred to as a selection transistor, and the transistor M3 is referred to as a driving transistor. The capacitor CS2 is provided to hold a gate voltage of the transistor M3. The transistor M3 has a backgate. The current driving capability of the transistor M3 is increased by electrical connection between the backgate and a gate of the transistor M3. A similar effect is obtained when a drain and the backgate of the transistor M3 are electrically connected to each other as illustrated in FIG. 5B.

The EL element DE2 includes a pair of electrodes (an anode and a cathode) and an EL layer placed between the pair of electrodes. In the example of FIG. 5A, the pixel electrode of the EL element DE2 is the anode and the common electrode thereof is the cathode. The EL layer at least includes a layer containing a light-emitting material (light-emitting layer). Moreover, another functional layer such as a layer containing an electron-transport material (electron-transport layer) or a layer containing a hole-transport material (hole-transport layer) can be provided in the EL layer as appropriate. The EL element is referred to as an organic EL element when containing an organic light-emitting material, and is referred to as an inorganic EL element when containing an inorganic light-emitting material. Although the EL element is provided in the subpixel 11 here, the light-emitting element is not limited to an EL element and may be a light-emitting diode or a light-emitting transistor, for example.

When the display device 100 displays color images, one pixel is composed of a predetermined number of subpixels. For example, one pixel can be composed of three subpixels 10 for expressing respective colors of red (R), green (G), and blue (B). FIG. 5C illustrates a structure example of the pixel portion 110 including such a pixel. A pixel 13<j,k> is composed of subpixels 10R<j,k>, 10G<j,k>, and 10B<j,k>. In the example of FIG. 5C, subpixels 10 for expressing the same color are provided in one column of the display portion 110. That is, the arrangement of the subpixels 11 in the pixel portion 110 is RGB stripe arrangement in the vertical direction (column direction).

A unit pixel can be composed of four subpixels 10 that express different colors. Examples of a combination of four colors in this case are RGB and Y (yellow) and RGB and C (cyan). FIG. 5D illustrates an example where one pixel consists of four (RGBC) subpixels 10. A pixel 14<j,k> includes subpixels 10R<j,k>, 10G<j,k>, 10B<j,k>, and 10C<j,k>. Here, the arrangement of the subpixels 10 is RGBC stripe arrangement in the vertical direction.

When one pixel is composed of four subpixels 10, the pixel can be composed of one subpixel 10R, one subpixel 10G, and two subpixels 10B, for example. In this case, the arrangement of the subpixels 10 can be RBGB stripe arrangement, for instance.

In this specification, to distinguish the components according to the color expressed by subpixels, an identification sign such as "R" or "_R" is added to reference numerals. For example, the subpixel 10R represents a red subpixel 10. A wiring SL1_G<k> represents the wiring SL1 in the k-th column to which a data signal for green is input. Hence, when it is not necessary to distinguish the expressed colors in FIG. 5C, a wiring SL1_R<k> is the wiring SL1 in the (3k−2)th column, a wiring SL1_G<k> is the wiring SL1 in the (3k−1)th column, and a wiring SL1_B<k> is the wiring SL1 in the 3k-th column. The same applies to the wirings SL2. FIG. 5D also shows reference numerals of the subpixels 10 and the wirings SL1 and SL2 for distinguishing the expressed colors and those without the intention of distinguishing the colors.

Figure 6:
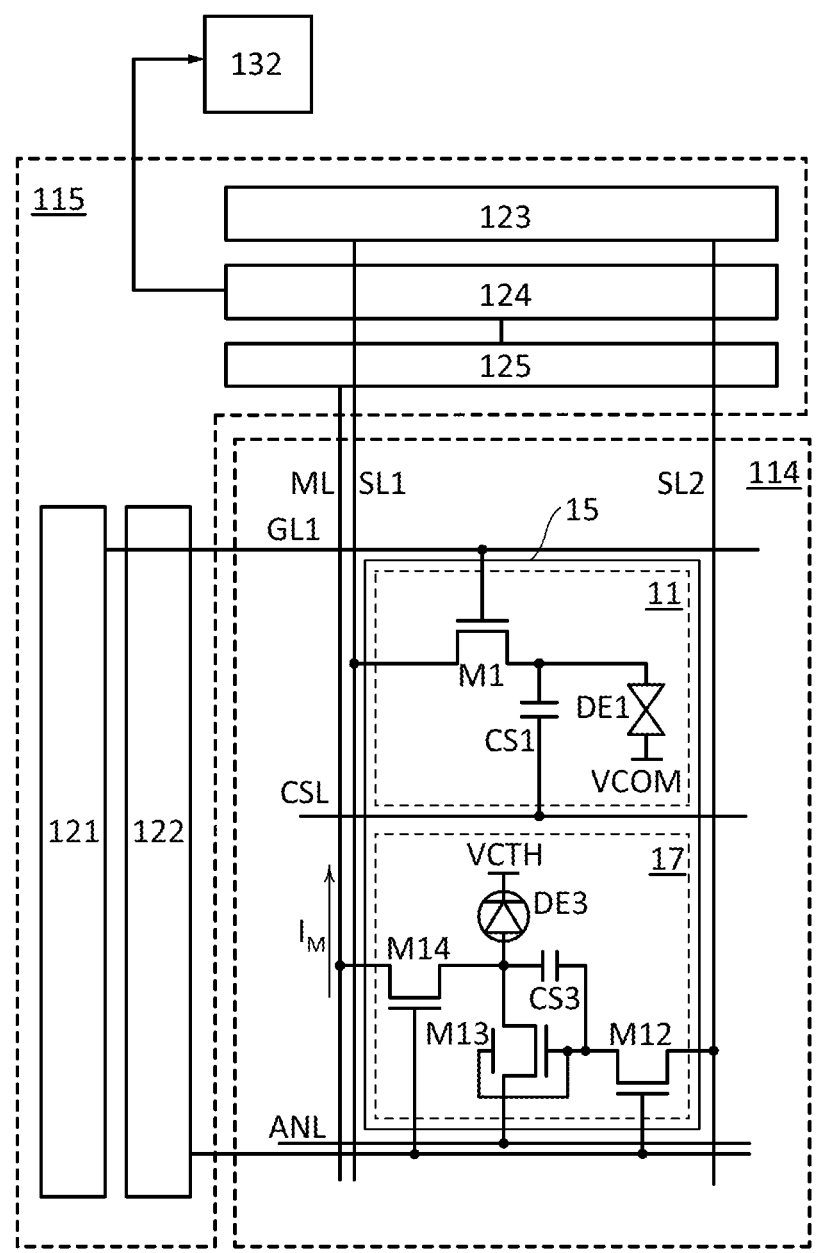
FIG. 6 illustrates a structure example of a pixel portion and peripheral circuits.

Note that the circuit configuration of the subpixels in the pixel portion 110 is not limited to those illustrated in FIGS. 5A and 5B, and any configuration is acceptable as long as one subpixel includes an LC element and an EL element. FIG. 6 illustrates another structure example of the pixel portion and the peripheral circuit. A pixel portion 114 illustrated in FIG. 6 includes subpixels 15. Although FIG. 6 shows only one subpixel 15, a plurality of subpixels 15 are arranged in a matrix in the pixel portion 114 as in the pixel portion 110. In the pixel portion 114, a plurality of wirings GL1, SL1, CSL, ANL, SL2, and ML are provided. The subpixel 15 is electrically connected to the wirings GL1, and CSL in a corresponding row and electrically connected to the wirings SL1, SL2, and ML in a corresponding column.

The subpixel 15 is a variation example of the subpixel 10 and includes a subpixel 17 instead of the subpixel 12. The subpixel 17 includes an EL element DE3, a capacitor CS3, and transistors M12 to M14. The transistor M12 is a pass transistor that connects a gate of the transistor M13 and the wiring SL2. The transistor M14 is a pass transistor that connects the wiring ML and the anode of the EL element DE3. The transistor M13 is a driving transistor and functions as a current source of current supplied to the EL element DE3. The capacitor CS3 is a storage capacitor for holding a voltage between the anode of the EL element DE3 and the gate of the transistor M13.

Providing the transistor M14 enables a drain current of the transistor M14 (current IM) to be output from the subpixel 17 to the wiring ML. The current IM corresponds to a current flowing through the EL element DE3. Thus, an analog signal (current IM) flowing through the wiring ML is analyzed and a voltage of a data signal input to the wiring SL2 is corrected on the basis of the analysis result, whereby deviation of the luminance of the EL element DE3 can be corrected.

A peripheral circuit 115 is a circuit where a signal processor circuit 124 and an output circuit 125 are added to the peripheral circuit 112. The output circuit 125 is electrically connected to the plurality of wirings ML. The output circuit 125 has a function of controlling output, to the signal processor circuit 124, of an analog signal transmitted through the wiring ML. The output circuit 125 selects some of the wirings ML in accordance with a control signal input from the outside and electrically connects the selected wirings ML to an input terminal of the signal processor circuit 124. That is, the output circuit 125 functions as a demultiplexer.

The signal processor circuit 124 has a function of processing an analog signal input from the pixel portion 114 through the output circuit 125 and generating a digital signal to be processed by the image processor 132. As the signal processor circuit 124, an analog-to-digital converter circuit (ADC) may be provided, for example. The ADC processes an analog signal input from the pixel portion 114 and converts it into a digital signal. The image processor 132 analyzes the digital signal output from the signal processor circuit 124 and corrects gray level data written to the wiring SL2.

In the peripheral circuit 115, the gate drivers 121 and 122 and the output circuit 125 can be provided in the transistor layer 163 together with the transistors M1 and M12 to M14 in the pixel portion 114, for example. In this case, the source driver 123 and the signal processor circuit 124 are provided in the source driver IC 200.

<<Source Driver IC>>

Figure 7:
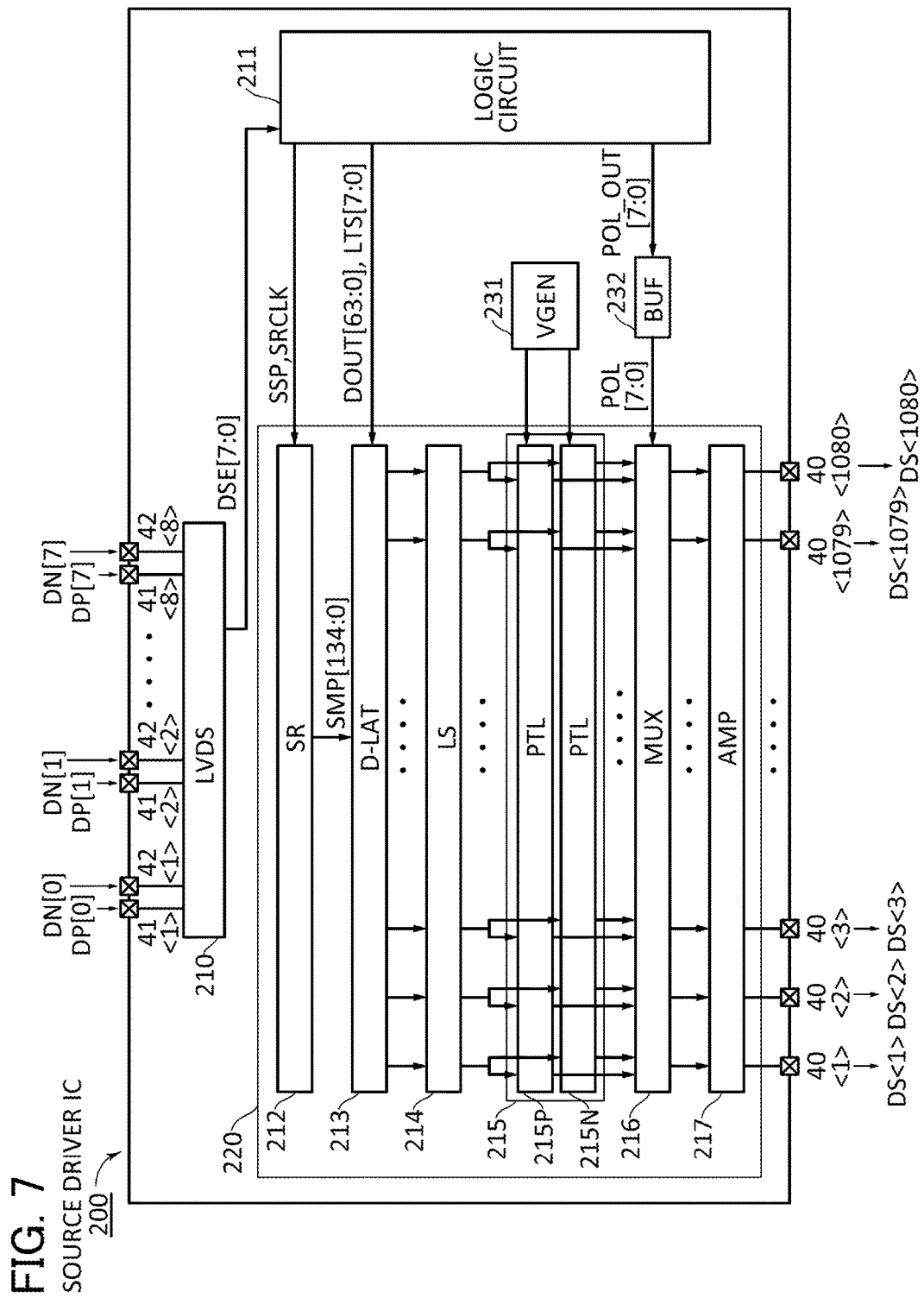
FIG. 7 is a block diagram illustrating a structure example of a source driver IC.

FIG. 7 illustrates a structure example of the source driver IC 200. Here, for easy understanding of this embodiment, the specifications of the source driver IC 200 and the display panel 160 are set as follows. An image signal transmitted to the source driver IC 200 is an 8-bit serial digital signal. Data of an 8-bit digital signal represents a gray level. Image signals are transmitted with differential signaling. One of differential image signals is an image signal DP[7:0] and the other is an image signal DN[7:0]. The number of output pins for data signals is 1080.

A pixel in the pixel portion 110 consists of three (RGB) subpixels 10 (FIG. 5C). The number of source driver ICs 200 used for the display panel 160 is determined by the number of subpixels 10 of the display panel 160 in the horizontal direction. For example, when the number of subpixels 10 in the horizontal direction is 1080 (=360×3 (RGB)), the number of source driver ICs 200 to be used is 2.

The source driver IC 200 includes 1080 pins 40, eight pins 41, eight pins 42, a low-voltage differential signaling (LVDS) receiver 210, a logic circuit 211, a circuit 220, a voltage generator circuit 231 (hereinafter referred to as VGEN 231), and a buffer circuit (BUF) 232. The circuit 220 includes a shift register (SR) 212, a latch circuit 213 (hereinafter referred to as D-LAT 213), a level shifter (LS) 214, a pass transistor logic circuit (PTL) 215, a multiplexer (MUX) 216, and an amplifier circuit (AMP) 217.

The pin 40 is an output pin for data signals and is electrically connected to the wiring SL1 or the wiring SL2. The pins 41 and 42 are input pins for differential signals. For example, a signal whose logic is inverted with respect to that of an input signal of the pin 41<1> is input to the pin 42<1>. Differential signals input to the pins 41 and 42 are generated by the image processor 132. For example, the image signals DP[0] to DP[7] are input to the pins 41<1> to 41<8>, respectively, and the image signals DN[0] to DN[7] are input to the pins 42<1> to 42<8>, respectively.

To the pins 41 and 42, not only the image signals DP[7:0] and DN[7:0] but also command signals are input. The source driver IC 200 is provided with input pins for power supply voltage, input pins for various signals, and output pins for various signals in addition to the pins 40 to 42.

The LVDS receiver 210 has a function of converting input differential signals into a single-ended signal. Here, the LVDS receiver 210 converts the image signals DP[7:0] and DN[7:0] into a single-ended image signal DSE[7:0].

The logic circuit 211 controls the circuit 220 in accordance with a command signal input from the outside, for example. Specifically, the logic circuit 211 generates signals SSP, SRCLK, LTS[7:0], POL_OUT[7:0], and the like. The signals SSP and SRCLK are control signals for the SR 212. The signal LTS[7:0] is a control signal for the D-LAT 213. The signal POL_OUT[7:0] is a control signal for the MUX 216.

The logic circuit 211 has a function of converting serial image signals into parallel image signals (serial-to-parallel conversion function). Specifically, the logic circuit 211 converts the signal DSE[7:0] into eight 8-bit digital signals (DOUT[63:0]). Data of the signal DOUT[8α+7,8α] (α is an integer of 0 to 7) is 8-bit gray level data written to the wiring SL1 or the wiring SL2.

Note that a variety of functional circuits can be provided in the source driver IC 200. For example, a correction circuit with a function of correcting a luminance change in the EL element DE2 due to temperature of usage environment or degradation of the EL element DE2 may be provided in the source driver IC 200. Specifically, the correction circuit has a function of correcting a data signal DS to be output to the wiring SL2.

Figure 8:
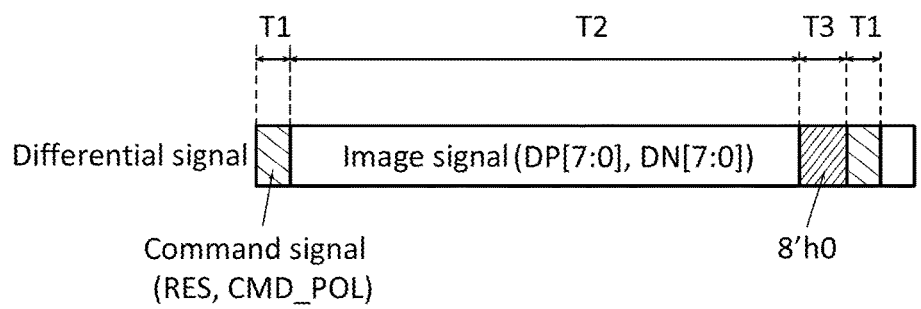
FIG. 8 illustrates an overview of the operation of a source driver IC.

The overview of the operation of the source driver IC 200 will be described with reference to FIG. 8. As shown in FIG. 8, the operation of the source driver IC 200 is broadly classified into three operations. A period T1 is a period for processing command signals. In the period T1, the logic circuit 211 processes differential signals input from the pins 41 and 42 as command signals. The length of the period T1 is determined by the number of command signals input to the logic circuit 211. At least a command signal (RES) for resetting the source driver IC 200 and a command signal (CMD_POL) for determining the polarity of the pin 40 are input to the logic circuit 211. Here, the data width of the command signal can be 1 to 8 bits.

In this specification, the polarity of the pin 40 refers to the polarity of the data signal DS output from the pin 40. The polarity of the data signal DS is positive when the voltage of the data signal DS is higher than or equal to VCOM (the common voltage of the LC element DE1), and is negative when this voltage is lower than VCOM. When the pixel consists of three (RGB) subpixels 10, the polarity of the pins 40<1> to 40<1080> is changed every 12 pins (=3 (RGB)×2 (SL1, SL2)×2 (positive, negative)).

The period T2 is a period for processing image signals. In the period T2, the source driver IC 200 processes differential signals input from the pins 41 and 42 as image signals. That is, in the period T2, data signals DS<1> to DS<1080> are generated from the image signals DP[7:0] and DN[7:0]. In the period T2, the image signal DP[7:0] is input to the pins 41 and the image signal DN[7:0] is input to the pins 42, and these image signals are converted into the signal DSE[7:0] by the LVDS receiver 210. The logic circuit 211 processes the signal DSE[7:0] output from the LVDS receiver 210 as an image signal, and controls the circuit 220 so that the circuit 220 generates the data signals DS<1> to DS<1080>.

The period T3 is a blanking period. In the period T3, differential signals with 8'h0 are input to the pins 41 and 42, for example. In the period T3, the source driver IC 200 is on standby. After the period T3, the next period T1 starts by input of the signal RES. The signal RES also serves as a trigger for command signal processing in the logic circuit 211.

The circuit 220 processes the signal DOUT[63:0] and generates 1080 data signals DS. The data signal DS is an analog signal representing gray level data. The data signals DS<1> to DS<1080> are output from the respective pins 40<1> to 40<1080>.

Here, the SR 212 includes 135 flip-flop circuits (hereinafter referred to as SR-FF). The signal SSP (start pulse signal) is input to the first SR-FF, whereby a 1-bit signal SMP (sampling signal) is output from each SR-FF at predetermined timing. Thus, a 135-bit signal SMP[134:0] is output from the SR 212. The timing at which each SR-FF outputs the signal SMP is controlled with the clock signal SRCLK.

The D-LAT 213 samples the signal DOUT[63:0] in accordance with the signal SMP[134:0]. Accordingly, the D-LAT 213 stores 1080 8-bit data signals. The timing of outputting the 1080 data signals from the D-LAT 213 is controlled with the signal LTS[7:0]. The LS 214 shifts the level of the 1080 data signals output from the D-LAT 213.

The PTL 215 is a circuit with a digital-to-analog (D/A) conversion function. Here, the PTL 215 generates 1080 pairs of analog signals on the basis of data of the output signals from the LS 214. Each pair of analog signals is composed of a positive analog signal and a negative analog signal. The polarity of the analog signal corresponds to the polarity of an alternating-current voltage signal for driving the LC element DE1.

The PTL 215 includes a PTL 215P and a PTL 215N. The PTL 215P has a function of converting an output signal from the LS 214 into a positive analog signal, and the PTL 215N has a function of converting an output signal from the LS 214 into a negative analog signal. The VGEN 231 is a circuit for generating a reference voltage used by the PTLs 215P and 215N to perform D/A conversion.

To the MUX 216, 1080 pairs of positive and negative analog signals are input. The MUX 216 selects one of the pairs of analog signals in accordance with the signal POL [7:0] and outputs the selected signal to the AMP 217. The BUF 232 buffers the signal POL_OUT, shifts the level of the signal POL_OUT, and outputs the signal POL[7:0].

The AMP 217 amplifies 1080 analog signals output from the MUX 216. The 1080 output signals of the AMP 217 are the data signals DS<1> to DS<1080>.

The source driver IC 200 can generate a pair of positive and negative analog signals from a digital signal with one gray level data, and selectively output one signal of the pair of analog signals from one pin 40. Thus, for example, in one horizontal period, the source driver IC 200 can output the data signals DS for alternating-current driving (alternating-current voltage signals) from the pins 40 in odd-numbered columns and output the data signals DS for direct-current driving (direct-current voltage signals) from the pins 40 in even-numbered columns. A hybrid display panel in which one subpixel includes a display element driven with alternating current and a display element driven with direct current can be driven with one type of the source driver IC 200. Consequently, providing the source driver IC 200 results in reduction in size and fabrication cost of a hybrid display device. Furthermore, the source driver IC 200 is versatile; the source driver IC 200 can also drive a liquid crystal display device and an EL display device because it can output the data signals DS for alternating-current driving or direct-current driving from all the pins 40 in one horizontal period. Examples of the structure and operation of the source driver IC 200 will be described in more details with reference to FIG. 9, FIG. 10, FIGS. 11A and 11B, FIGS. 12A and 12B, and FIGS. 13 to 16.

Figure 9:
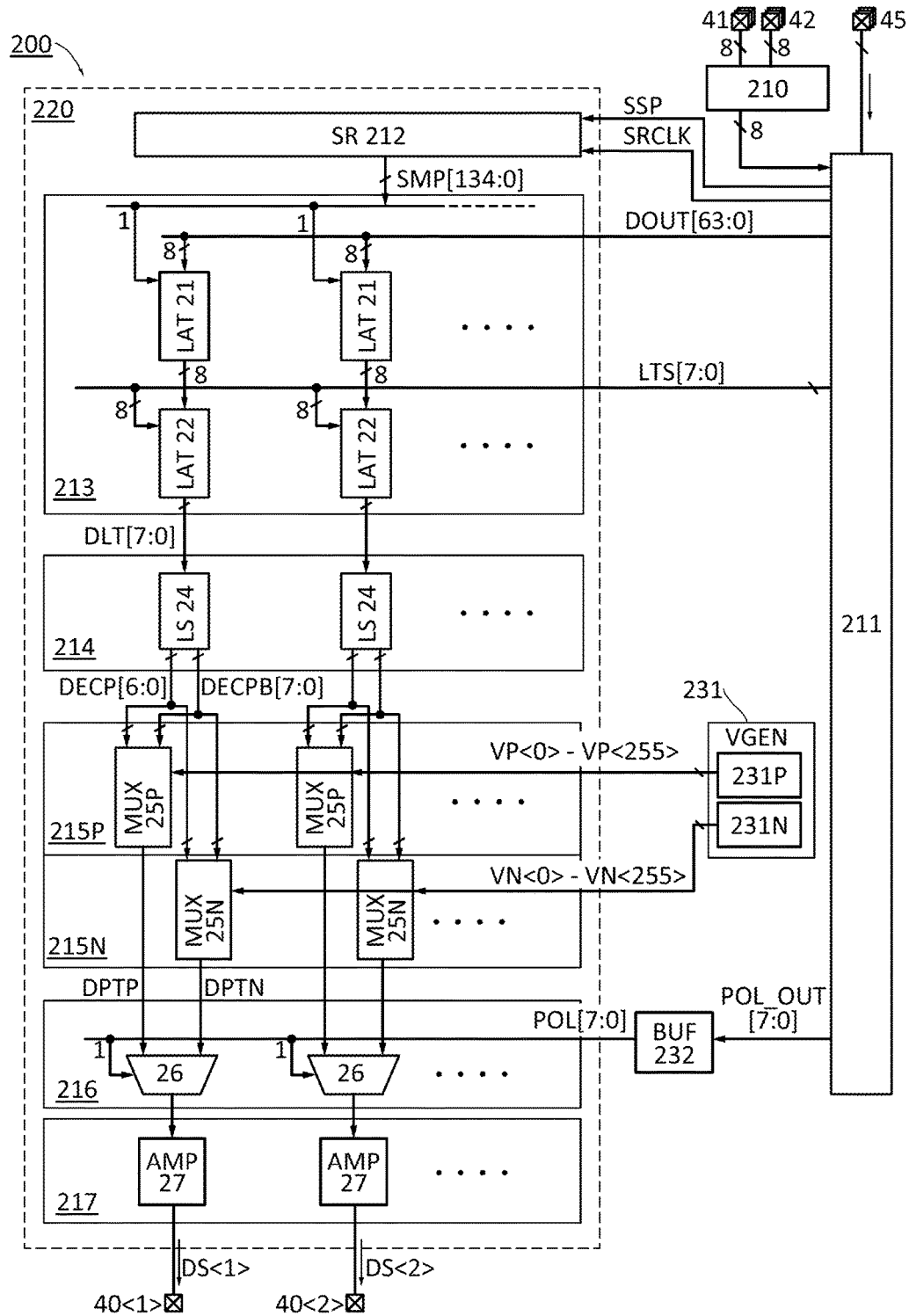
FIG. 9 is a block diagram illustrating a structure example of a source driver IC.

FIG. 9 is a block diagram illustrating a structure example of the source driver IC 200 and specifically shows the components in the first and second columns as the circuit 220. A plurality of pins 45 illustrated in FIG. 9 are used to input control signals for controlling the logic circuit 211. Here, the pin 45 is an input terminal for single-ended digital signals. The pins 45 are provided as appropriate. For example, a control signal for setting the polarity of the pin 40 may be input from the pin 45, which will be described later.

(D-LAT 213)

As illustrated in FIG. 9, the D-LAT 213 includes LATs 21 and 22 for each column. Each of the LATs 21 and 22 is a latch circuit capable of storing 8-bit data. Eight LATs 21 are controlled with each bit of the signal SMP[134:0]. The LAT 22 latches an output signal from the LAT 21 in a corresponding column. A signal DLT[7:0] output from the LAT 22 has the same logic as data held in the LAT 21. The signal LTS [7:0] is input to each of the LATs 22 as a latch signal. By input of an active latch signal, data in the LAT 22 is updated.

Note that in FIG. 9, Arabic numerals (1, 8) that are not used as reference numerals represent the bit width of signals. As an example, FIG. 9 illustrates that the LAT 21 is supplied with an 8-bit signal DOUT from the logic circuit 211 and a 1-bit signal SMP from the SR 212.

(LS 214)

The LS 214 includes a LS 24 for each column. In each column, the LS 24 shifts the level of the signal DLT[7:0] and generates signals DECP[7:0] and DECPB[7:0]. The signal DECP[7:0] has the same logic as the signal DLT[7:0]. The signal DECPB[7:0] is an inversion signal of the signal DECP[7:0]. Note that here, the signal DECP[6:0] of low-order 7 bits of the signal DECP[7:0] is output to the PTLs 215P and 215N. Note that the components of the output signals from the LS 214 are set as appropriate in accordance with the configuration of a circuit that performs D/A conversion.

(PTLs 215P and 215N)

The PTL 215P includes a MUX 25P for each column, and the PTL 215N includes a MUX 25N for each column. The MUX 25P and the MUX 25N each have a function of converting an output signal from the LS 214 into an analog signal. Here, the MUX 25P converts the signal DECPB[7:0] into an analog signal to generate a signal DPTP, and the MUX 25N converts the signal DECPB[7:0] into an analog signal to generate a signal DPTN. The signals DPTP and DPTN are analog signals having a voltage corresponding to gray level data. The signal DPTP corresponds to a positive data signal DS, and the signal DPTN corresponds to a negative data signal DS.

(MUX 216 and AMP 217)

The MUX 216 includes a selector circuit (SEL) 26 for each column, and the AMP 217 includes an AMP 27 for each column. The SEL 26 outputs one of the signals DPTP and DPTN to the AMP 27 in accordance with a control signal. Any one bit of the signal POL[7:0] is input to the SEL 26 as a control signal. The SEL 26 outputs the signal DPTP when data of a 1-bit signal POL input thereto is "1," and outputs the signal DPTN when the data is "0."

An output signal from the SEL 26 is amplified by the AMP 27, and the amplified signal is output from the AMP 27. When the signal DPTP is amplified by the AMP 27, a positive data signal DS is obtained. When the signal DPTN is amplified by the AMP 27, a negative data signal DS is obtained. That is, the polarity of the signal DS can be determined by data ("0"/"1") of the signal POL for controlling the SEL 26 in a corresponding column.

(VGEN 231)

The VGEN 231 includes a VGEN 231P and a VGEN 231N. The VGEN 231P generates voltages VP<0> to VP<255>, and the VGEN 231N generates voltages VN<0> to VN<255>. The voltages VP<0> to VP<255> are reference voltages for D/A conversion in the PTL 215P and correspond to respective gray levels 0 to 255. The voltages VN<0> to VN<255> are reference voltages for D/A conversion in the PTL 215N and correspond to respective gray levels 0 to 255.

The voltage VP<255> is higher than the voltage VP<0>, and the voltage VN<255> is lower than the voltage VN<0>. For example, when the voltage VP<0> and the voltage VN<0> are set at the same voltage as VCOM (the common voltage of the LC element DE1), the MUX 25P can generate an analog signal with a voltage higher than or equal to VCOM and the MUX 25N can generate an analog signal with a voltage lower than or equal to VCOM.

<Digital-to-Analog Conversion>

Figure 10:
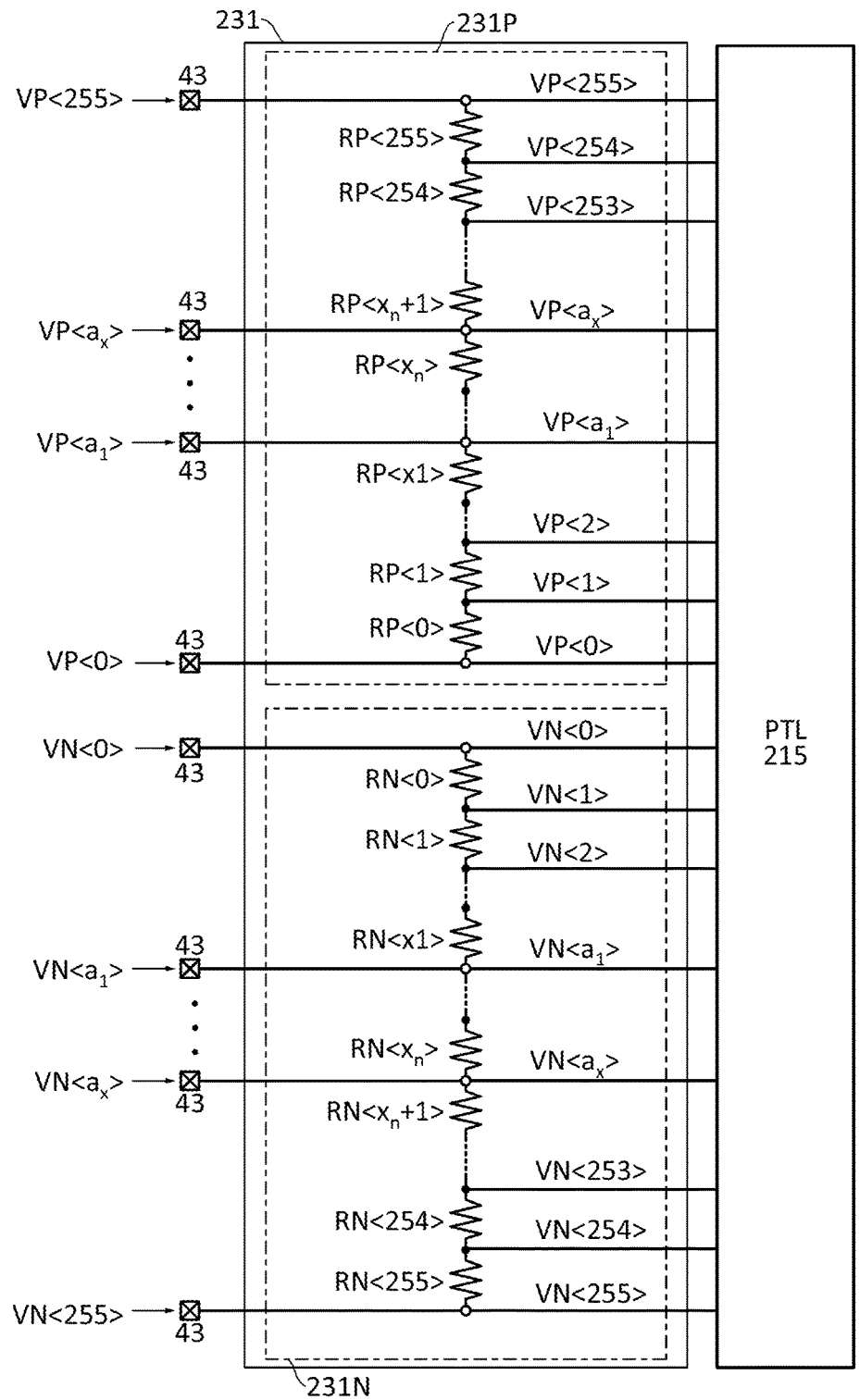
FIG. 10 is a circuit diagram illustrating a configuration example of a voltage generator circuit.
Figure 11A:
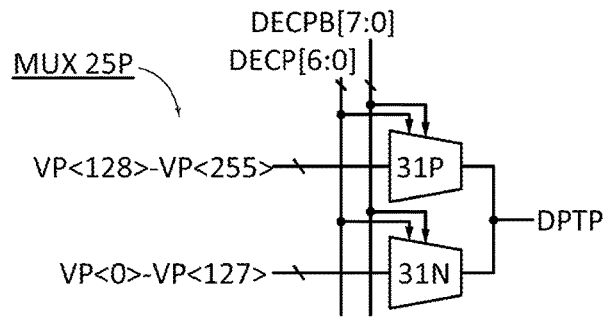
FIGS. 11A and 11B are circuit diagrams illustrating a configuration example of a multiplexer in a pass transistor logic circuit.
Figure 11B:
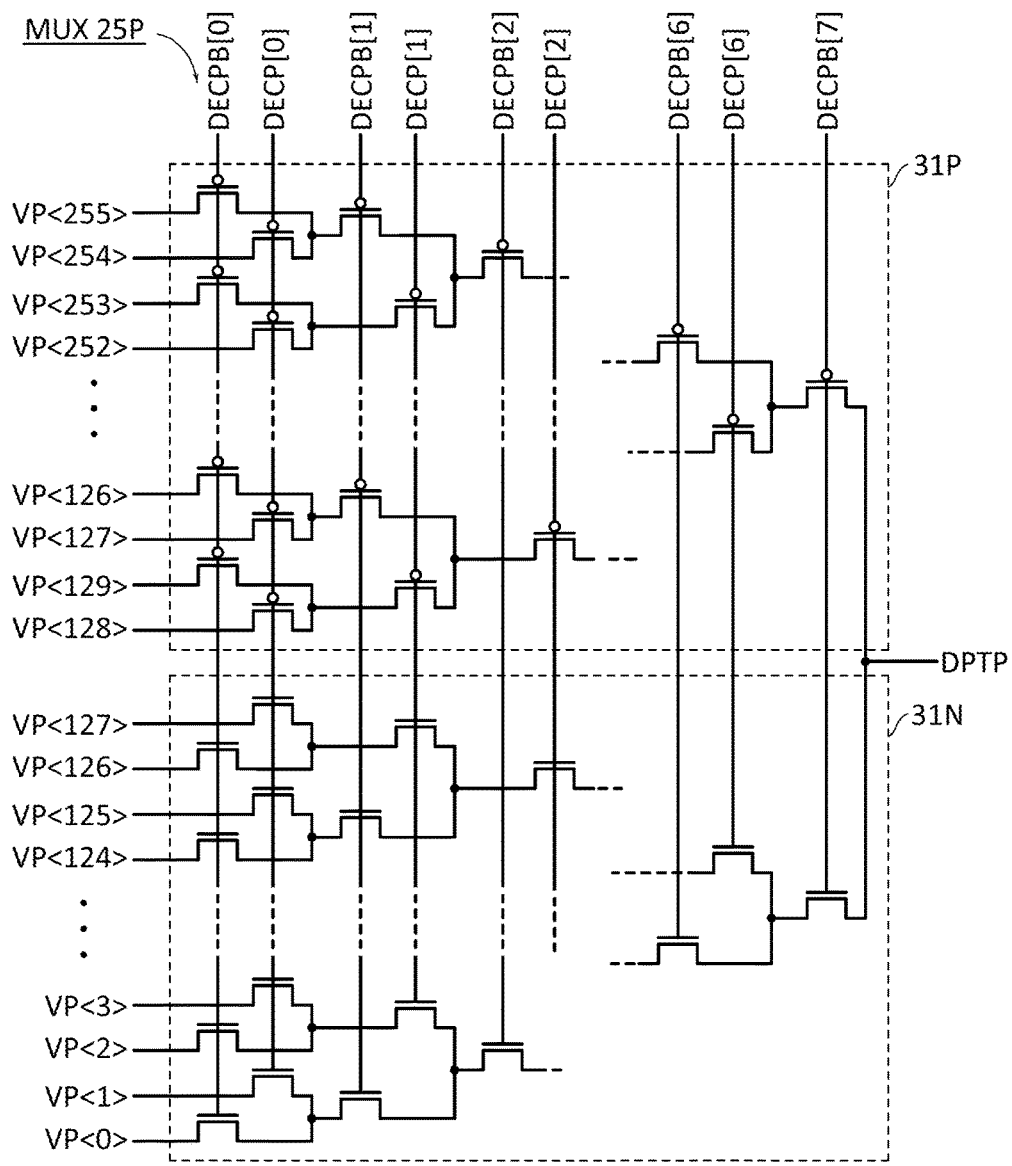
Figure 12A:
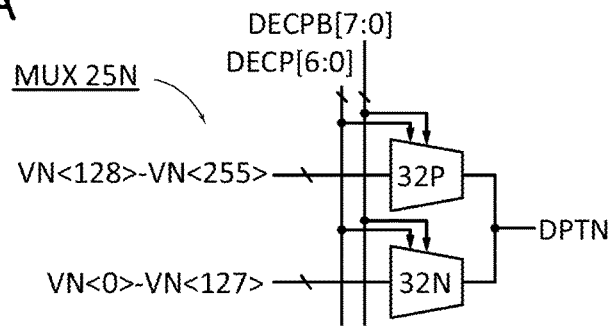
FIGS. 12A and 12B are circuit diagrams illustrating a configuration example of a multiplexer in a pass transistor logic circuit.
Figure 12B:
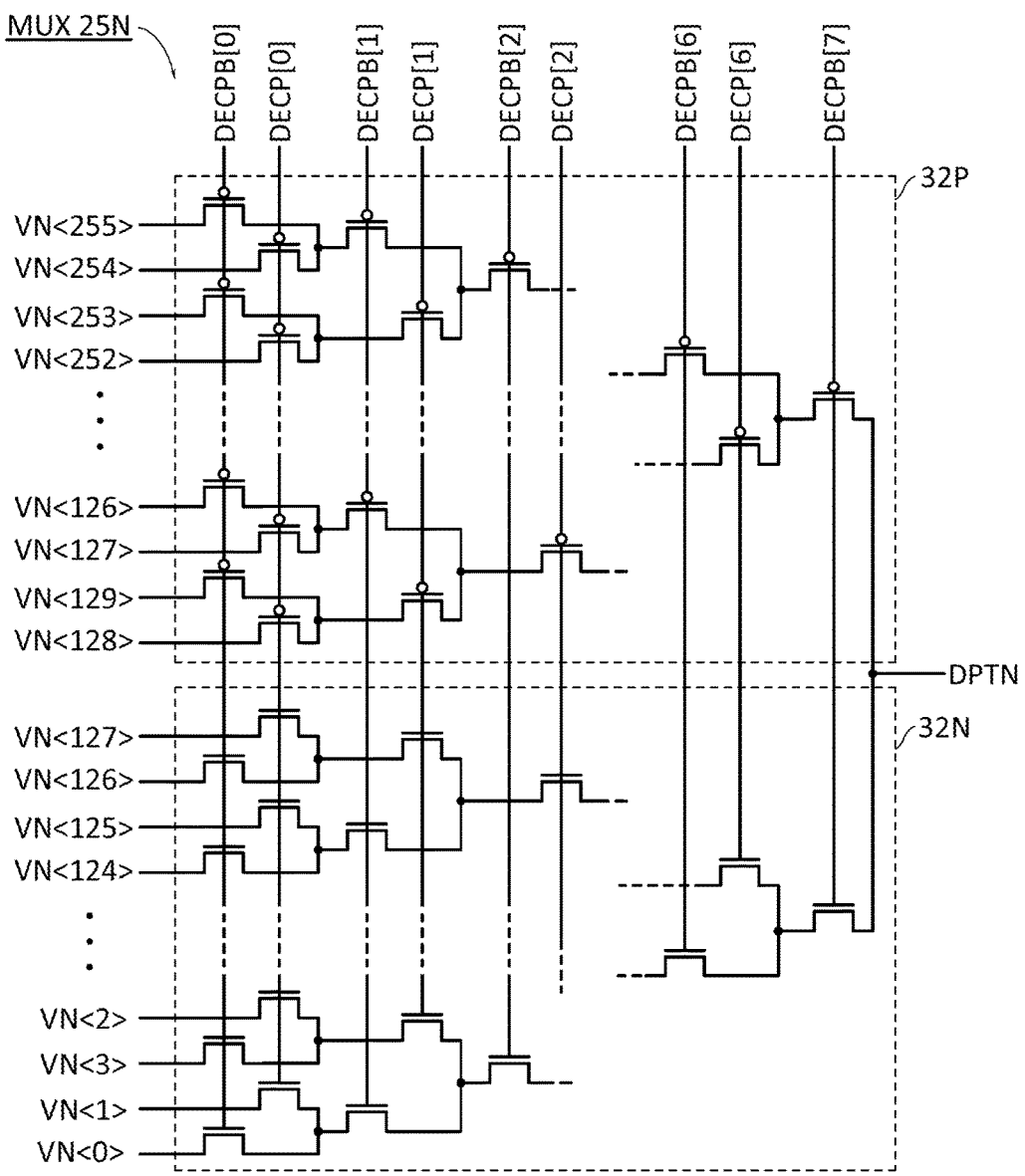

A D/A conversion function of the PTLs 215P and 215N will be described with reference to FIG. 10, FIGS. 11A and 11B, and FIGS. 12A and 12B. FIG. 10 illustrates a configuration example of the VGEN 231. FIGS. 11A and 11B illustrate a configuration example of the MUX 25P. FIGS. 12A and 12B illustrate a configuration example of the MUX 25N.

(VGEN 231)

As illustrated in FIG. 10, the VGEN 231 includes two resistive voltage divider circuits. One of the two resistive voltage divider circuits is the VGEN 231P, and the other is the VGEN 231N. A plurality of pins 43 for supplying a reference voltage to the VGEN 231 are provided in the source driver IC 200.

To generate the voltages VP<0> to VP<255>, the VGEN 231P includes resistors RP<0> to RP<255> that are electrically connected in series with each other.

The voltages VP<0> and VP<255> are supplied from the pins 43. The voltage VP<0> is applied to the resistor RP<0>, and the voltage VP<225> is applied to the resistor RP<255>. Here, the resistances of the resistors RP<0> to RP<255> are set so that the voltages VP<0> to VP<255> correspond to gamma characteristics (driving voltage vs. transmission) of liquid crystal. Furthermore, a plurality of voltages (e.g., VP<$a_1$> and VP<$a_x$>) among the voltages VP<1> to VP<254> are supplied from the pins 43. By adjusting reference voltages input to the pins 43, gamma correction that is more suitable for the LC element DE1 can be performed.

To generate the voltages VN<0> to VN<255>, the VGEN 231N includes resistors RN<0> to RN<255> that are electrically connected in series with each other. The VGEN 231N has a similar circuit configuration to that of the VGEN 231P; thus, the description of the VGEN 231P is referred to for the VGEN 231N.

(MUX 25P and MUX 25N)

As illustrated in FIG. 11A, the MUX 25P includes a MUX 31P and a MUX 31N. The MUX 31P and the MUX 31N are each a 128-input 1-output multiplexer. The signals DECPB [7:0] and DECP[6:0] are control signals for the MUX 31P and the MUX 31N. On the basis of these signals, one of outputs signals of the MUX 31P and the MUX 31N is output from an output terminal of the MUX 25P as the signal DPTP.

As illustrated in FIG. 11B, the MUX 31P is a pass transistor logic circuit composed of p-channel transistors, and the MUX 31N is a pass transistor logic circuit composed of n-channel transistors. The voltages VP<128> to VP<255> are input to 128 respective input terminals of the MUX 31P, and the voltages VP<0> to VP<127> are input to 128 respective input terminals of the MUX 31N.

As illustrated in FIG. 12A, the MUX 25N includes a MUX 32P and a MUX 32N. The MUX 32P and the MUX 32N are each a 128-input 1-output multiplexer and have the same circuit configuration as the MUX 31P and the MUX 31N, respectively. The voltages VN<128> to VN<255> are input to 128 respective input terminals of the MUX 32P, and the voltages VN<0> to VN<127> are input to 128 respective input terminals of the MUX 32N.

For example, when data of the signal DLT[7:0] is 8'h2, that is, when data of the signal DECPB[7:0] is "11111101," the MUX 25P outputs the voltage VP<2> and the MUX 25N outputs the voltage VN<2>. In other words, the MUX 25P outputs a positive analog voltage corresponding to gray level data stored in the LAT 22. In such a manner, the MUX 25P functions as a decoder; it decodes gray level data and generates a positive analog voltage corresponding to the gray level data. The MUX 25N is similar to the MUX 25P and has a function of decoding gray level data and generating a negative analog voltage.

<<Pin Polarity Control>>

Figure 13:
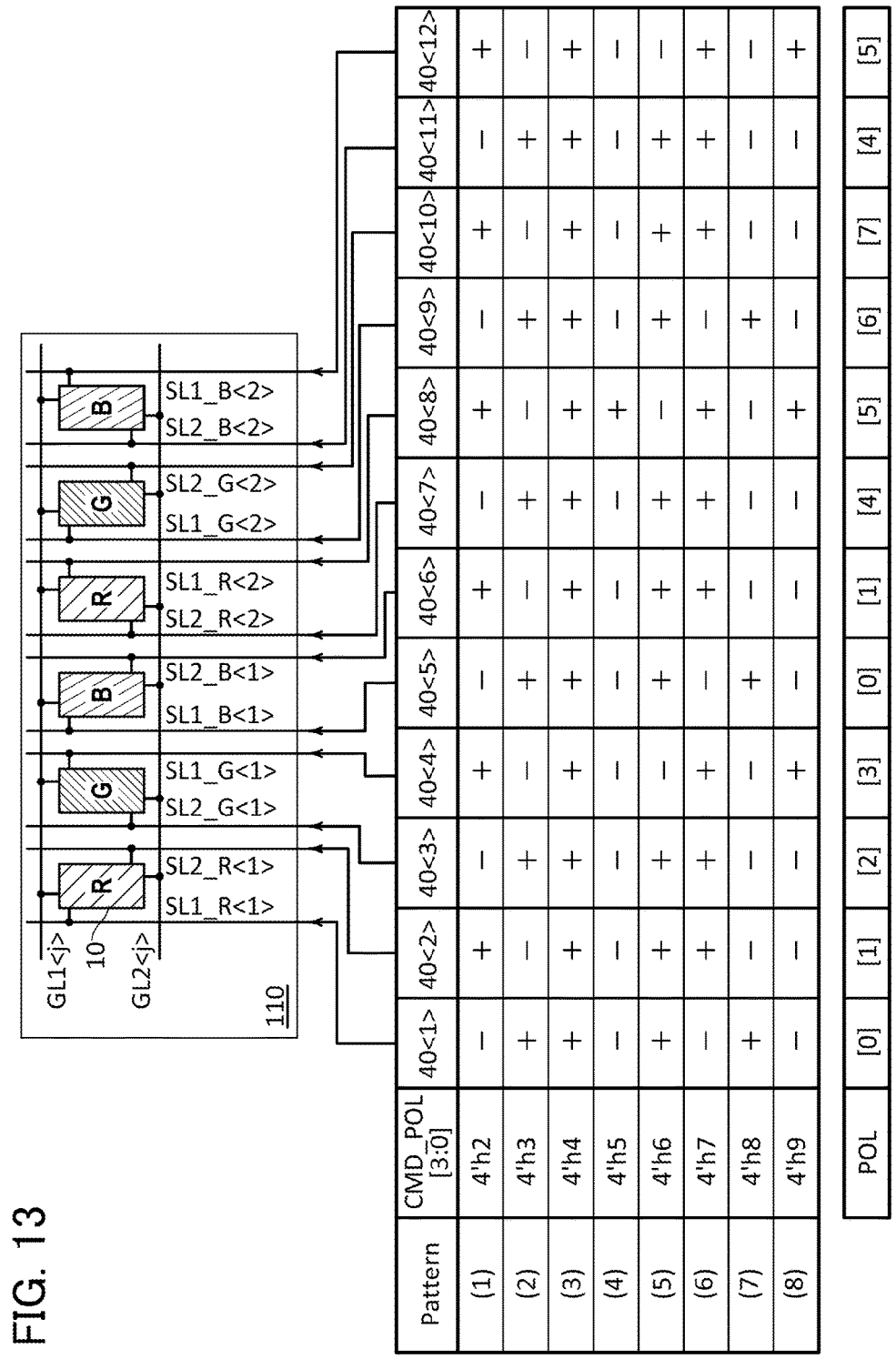
FIG. 13 illustrates an example of pin polarity control.

When the pixel in the display panel 160 consists of three (RGB) subpixels 10, the polarity of the pins 40<1> to 40<1080> is changed every 12 pins (=3 (RGB)×2 (SL1, SL2)×2 (positive, negative)). Hence, control of the polarity of the pins 40 with command signals will be described here, with attention focused on 12 pins 40<1> to 40<12>. FIG. 13 shows the relation between data of the signal CMD_POL and the polarity of the pins 40<1> to 40<12>, and the correspondence between the pins 40<1> to 40<12> and the bits of the signal POL[7:0]. For example, FIG. 13 shows that the signal POL[0] is input to the SEL 26 in the first column in order to control the polarity of the pin 40<1>.

FIG. 13 also illustrates an example of connection between the pins 40<1> to 40<12> and the wirings SL1 and SL2 in the display panel 160. As illustrated in FIG. 13, the pins 40<1>, 40<4>, and 40<5> are electrically connected to the wirings SL1_R<1>, SL1_G<1>, and SL1_B<1>, respectively, for driving the unit pixels in the first column. The pins 40<2>, 40<3>, and 40<6> are electrically connected to the wirings SL2_R<1>, SL2_G<1>, and SL2_B<1>, respectively, for driving the pixels in the first column. Similarly, the pins 40<7> to 40<12> are electrically connected to the wiring SL1 or the wiring SL2 for driving the pixels in the second column.

The polarity of the pins 40<1> to 40<12> is determined in consideration of the attribute of the source lines (e.g., the type or color of a display element to be driven) connected to the pins 40<1> to 40<12>, for example. Here, there are eight polarity patterns of the pins 40<1> to 40<12>. For convenience, these eight polarity patterns are referred to as patterns (1) to (8). The polarity of the pins 40<1> to 40<12> is set to one of the patterns (1) to (8) by the signal CMD_POL [4:0]. For example, when data of the signal CMD_POL is 4'h5("0101"), positive data signals DS<1> to DS<12> are output from the pins 40<1> to 40<12>. Here, the data width of the command signal (CMD_POL) for setting a polarity pattern is 4 bits; however, it can be determined on the basis of the number of polarity patterns that can be set by the logic circuit 211.

The patterns (1) and (2) are polarity patterns for an LC display panel. When data of the signal CMD_POL is switched between "0010" (4'h2) and "0011" (4'h3) every frame period, the driving scheme is source line inversion; when data switching is performed every horizontal period, the driving scheme is dot inversion.

The patterns (3) and (4) are polarity patterns for an EL display panel. The pattern (3) is a pattern at the time when the pixel electrode serves as the anode of the EL element. The pattern (4) is a pattern at the time when the pixel electrode serves as the cathode of the EL element.

The patterns (5) to (8) are polarity patterns for a hybrid display panel. With the patterns (5) and (6), a positive data signal is input to the wiring SL2. With the patterns (7) and (8), a negative data signal is input to the wiring SL2.

For example, when data of the signal CMD_POL[3:0] is switched between 4'h6 and 4'h7 every frame period, the LC element DE1 is driven with the source line inversion scheme, and a positive data signal is written to the EL element DE2. When such data switching is performed every horizontal period, the LC element DE1 is driven with the dot inversion scheme.

As has been described, the source driver IC 200 is capable of driving three types of display panels and is versatile.

The polarity patterns are not limited to the example in FIG. 13. As described above, the polarity patterns of the pins 40<1> to 40<12> are set in consideration of the attribute of the source lines connected to the pins 40<1> to 40<12>, for example. Thus, the patterns (9) to (12) are set, for instance, in order to drive a hybrid display panel in which the wirings SL1 and SL2 are arranged as illustrated in FIG. 14.

Setting the polarity pattern with the signal CMD_POL[3:0] specifically means that the logic circuit 211 sets data of the signal POL_OUT[7:0] in accordance with data of the signal CMD_POL[3:0]. For example, when data of the signal CMD_POL[3:0] is 4'h7, the logic circuit 211 generates the signal POL_OUT[7:0] having data "011110110."

Here, four pairs of the pins 40 have the same polarity in the case of employing the patterns (1) to (12); thus, the polarity patterns of 12 pins 40 can be set by an 8-bit signal POL_OUT. Note that the data width of the signal POL_OUT is not limited to 8 bits and may be 12 bits, for example. When the data width of the signal POL_OUT is 12 bits, the number of wirings for transmitting the signal POL and the number of elements in the logic circuit 211 increase; however, redundancy of the polarity patterns of the pins 40<1> to 40<12> increases because the polarities of the pins 40<1> to 40<12> can be controlled independently of each other. Consequently, the specifications of a pixel portion that the source driver IC 200 can drive are less limited, resulting in greater versatility of the source driver IC 200.

Figure 14:
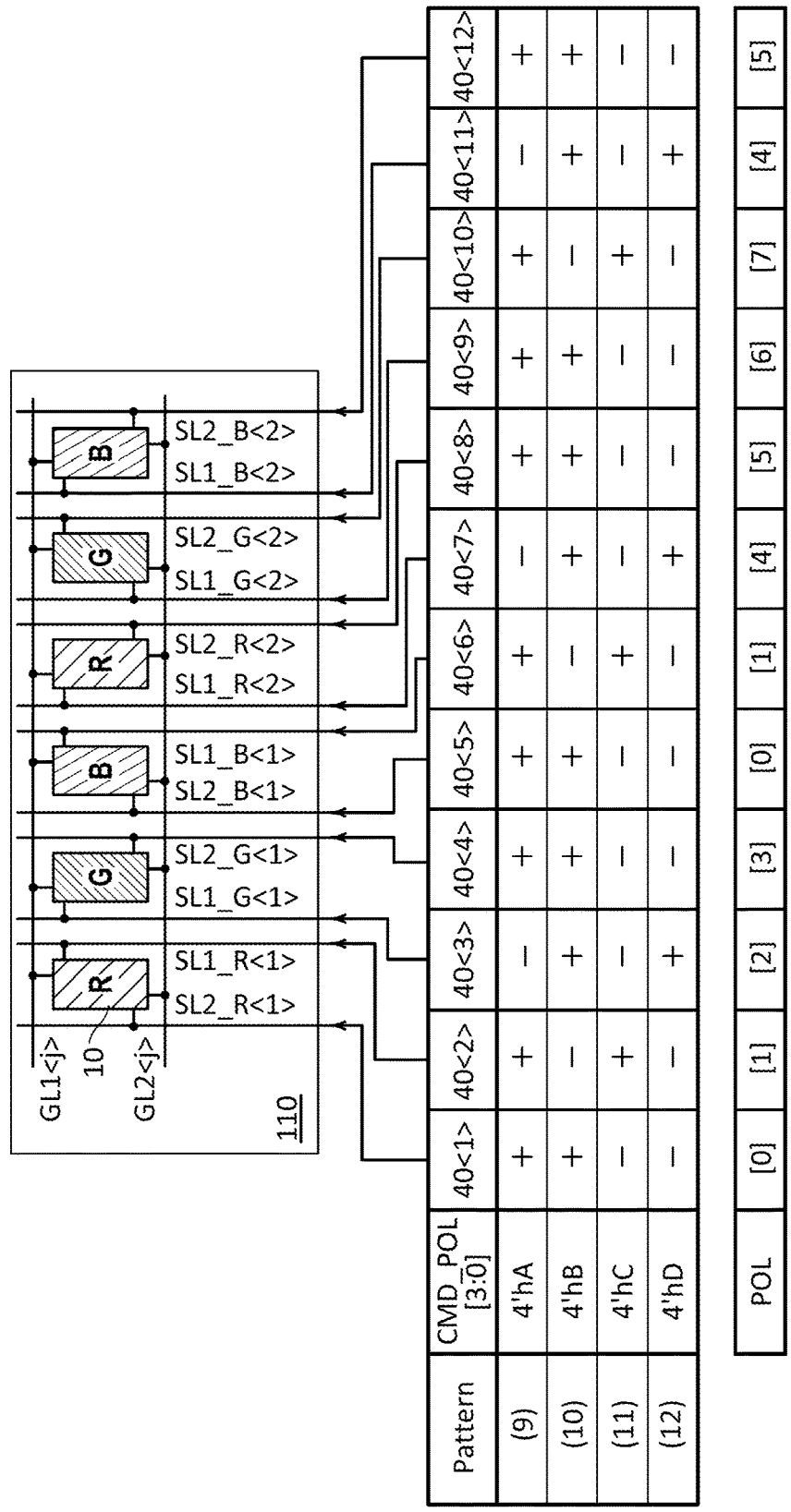
FIG. 14 illustrates an example of pin polarity control.
Figure 15:
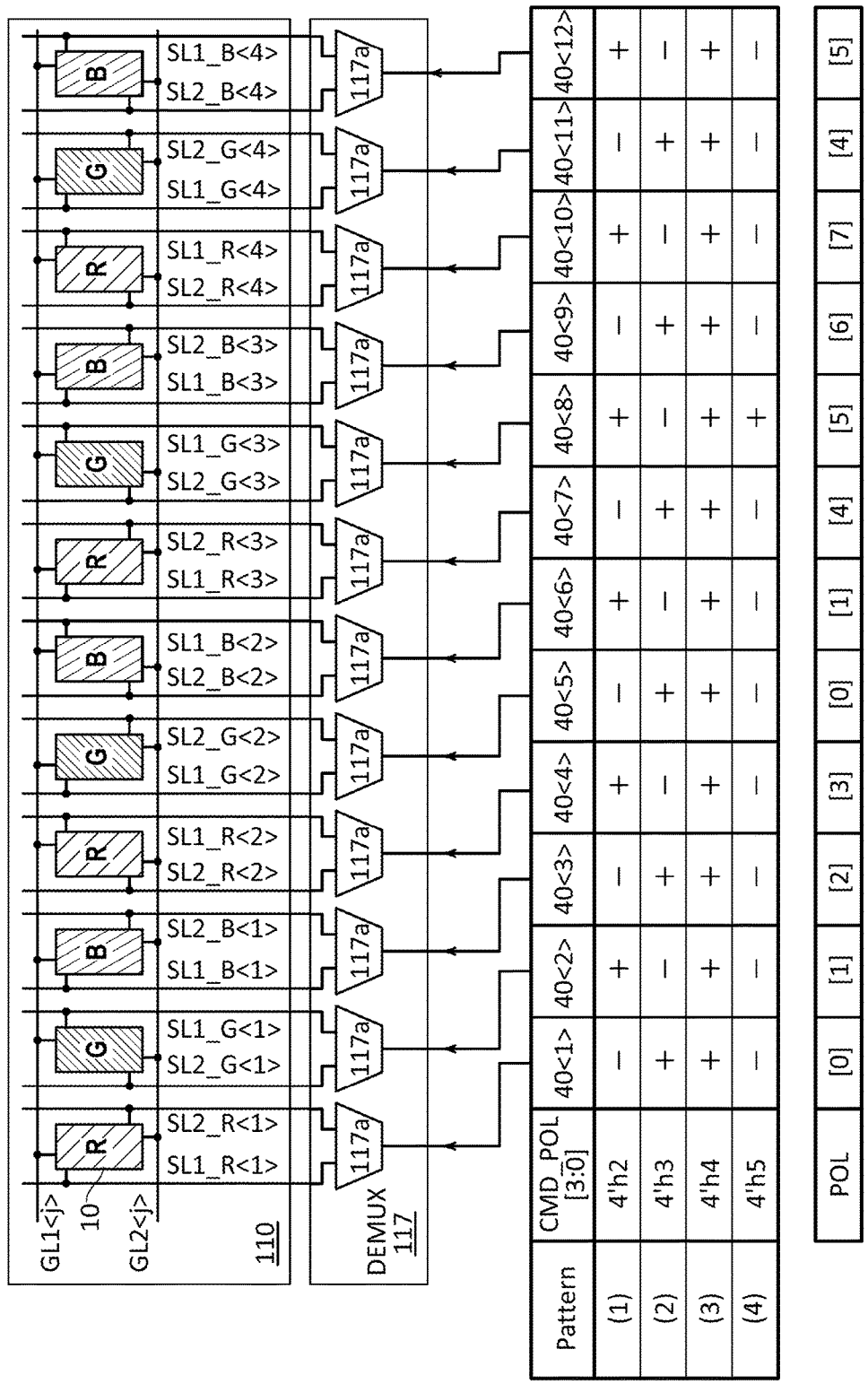
FIG. 15 illustrates an example of pin polarity control.
Figure 16:
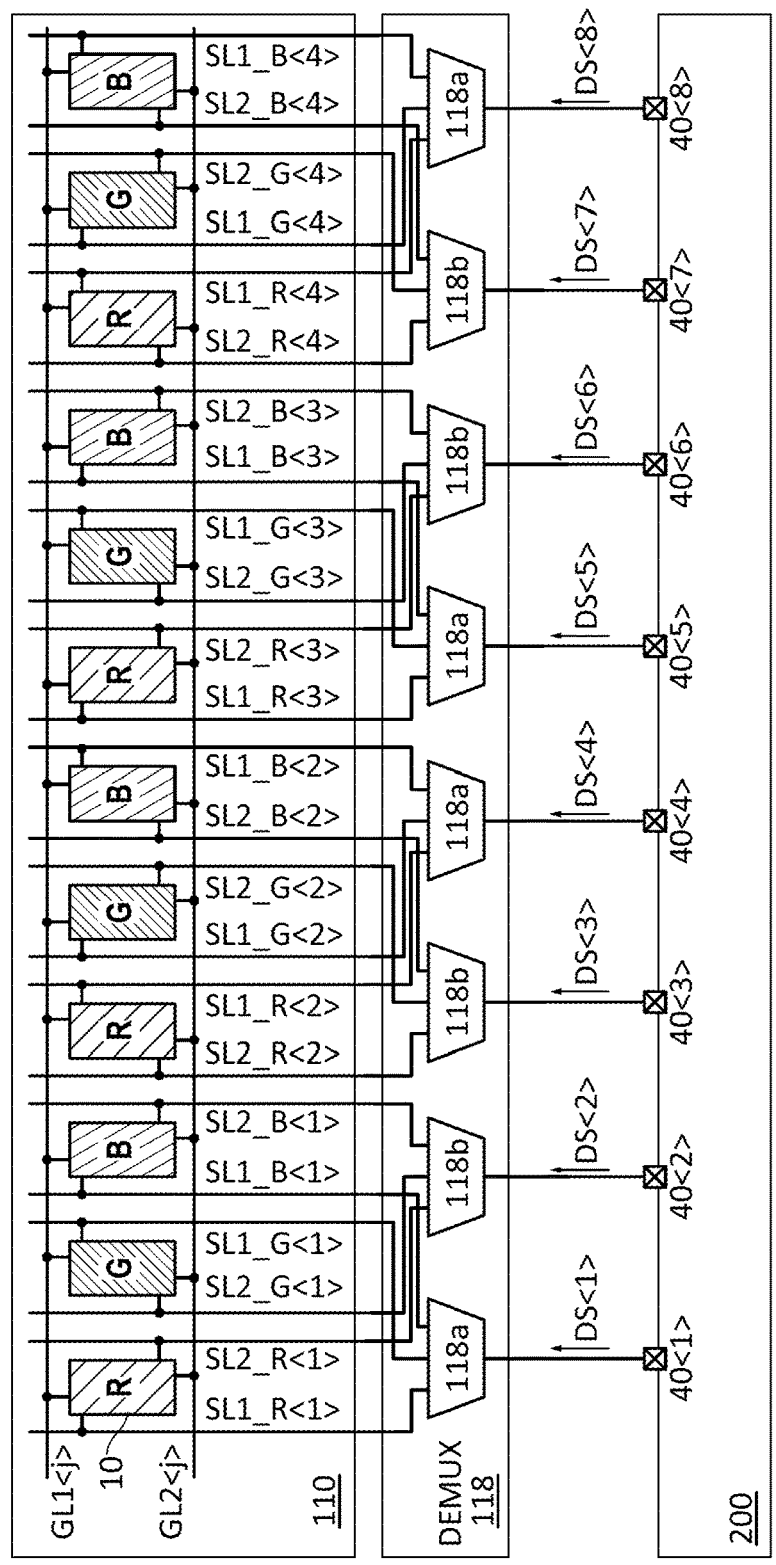
FIG. 16 illustrates an example of connection between pins and a pixel portion.

In the examples of FIGS. 13 and 14, one pin 40 is electrically connected to one given source line (wiring SL1 or wiring SL2) in the pixel portion 110. Accordingly, the terminal portion 173 in the display panel 160 needs to be provided with terminals the number of which is at least the total number of the wirings SL1 and the wirings SL2. For example, providing a demultiplexer (DEMUX) in the peripheral circuit 112 enables reduction in the number of terminals of the terminal portion 173. FIGS. 15 and 16 illustrate examples of the configuration of a DEMUX.

A DEMUX 117 illustrated in FIG. 15 includes a plurality of circuits 117a. The circuit 117a functions as a 1-input 2-output DEMUX. In accordance with a control signal input from the outside, the circuit 117a outputs the data signal DS output from the pin 40, from one of the output terminals.

Elements such as transistors that constitute the DEMUX 117 are fabricated in the transistor layer 163 together with the pixel portion 110. Providing the DEMUX 117 allows reduction in the number of terminals of the terminal portion 173. Moreover, as illustrated in FIG. 15, pixels in four columns can be driven with the signals DS output from 12 pins 40.

In the example of FIG. 15, the timing for writing the data signal DS varies between the wiring SL1 and the wiring SL2 in one horizontal period. Thus, the patterns (5) to (12) are not used although the display panel 160 is a hybrid display panel. For example, the data signal DS is written to the wiring SL1 first, and then to the wiring SL2. Specifically, the polarity patterns of the pins 40 are controlled in the following manner. In one horizontal period, the signal CMD_POL [3:0] with data of 4'h2 is input to the source driver IC 200, and the data signal DS for alternating-current driving is output from each pin 40. Then, at predetermined timing, the signal CMD_POL[3:0] with data of 4'h4 is input to the source driver IC 200, and the data signal DS for direct-current driving is output from each pin 40.

A DEMUX 118 illustrated in FIG. 16 includes a plurality of circuits 118a and 118b. FIG. 16 illustrates the connection relation between the DEMUX 118 and the pins 40<1> to 40<8>.

The circuit 118a functions as a 1-input 3-output DEMUX. The signal DS output from the pin 40 is output from one of the output terminals of the circuit 118a in accordance with a control signal input from the outside. The circuit 118b has the same configuration as the circuit 118a and functions in the same manner as the circuit 118a. Here, the circuit 118a has a function of selecting one of three wirings SL1 (SL1_R, SL1_B, SL1_G) in one pixel and electrically connecting the selected wiring to the pin 40. The circuit 118b has a function of selecting one of three wirings SL2 (SL2_R, SL2_B, SL2_G) in one pixel and electrically connecting the selected wiring to the pin 40. Providing the DEMUX 118 allows pixels in one column to be driven with the signals DS output from two pins 40.

The patterns (1) to (12) are set with differential command signals input from the pins 41 and 42; however, there is no particular limitation on a way of setting the patterns (1) to (12). For example, single-ended digital signals for controlling polarity patterns may be input to the logic circuit 211 from one pin 45 or a plurality of pins 45. When the data width of digital signals used for controlling polarity patterns is 4 bits, four pins 45 are used as pins for inputting these digital signals.

In such a case, a signal CMD_SW for determining whether the signal CMD_POL is enabled or disabled is used as a command signal. In the period T1, the signal CMD_SW is input to the pins 41 and 42 prior to the signal CMD_POL. When the signal CMD_POL is disabled by the signal CMD_SW, the logic circuit 211 generates the signal POL_OUT[7:0] on the basis of data of digital signals input from the pins 45.

As described above, the source driver IC 200 is a versatile driver IC capable of driving display panels with various configurations.

<<Driver IC>>

Although the examples where the source driver IC 200 is used in the peripheral circuit of the display panel are shown above, a driver IC applicable to the peripheral circuit 112 is not limited to a source driver IC. For example, each of the gate drivers 121 and 122 may be constituted by a gate driver IC. Some examples of driver ICs applicable to the peripheral circuit 112 will be shown below using FIGS. 17A to 17C.

Figure 17A:
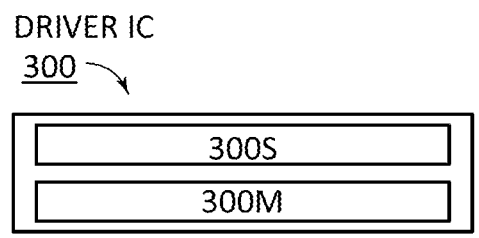
FIGS. 17A to 17C are block diagrams each illustrating a structure example of a driver IC.

A driver IC 300 illustrated in FIG. 17A is a variation example of the source driver IC 200 and is a driver IC where a circuit 300M is added to a source driver. A circuit 300S is a source driver and has the same configuration as an internal circuit of the source driver IC 200. The circuit 300M is a signal processor circuit for processing an analog signal input from the pixel portion 114 and has the function of the signal processor circuit 124. The driver IC 300 is suitable for a source driver for the pixel portion 114 (FIG. 6).

Figure 17B:
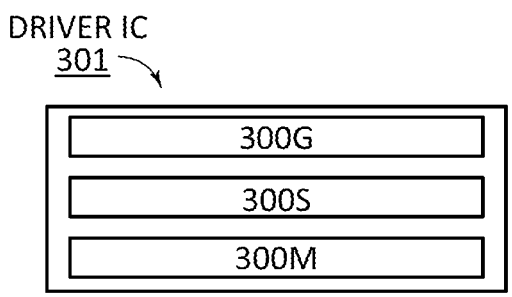
Figure 17C:
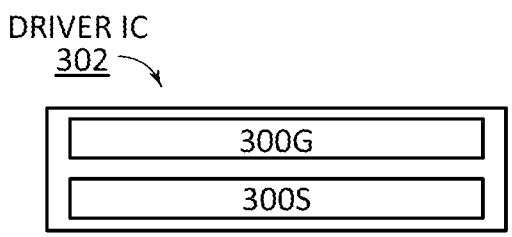

A gate driver may be integrated into the driver IC 300; such an example is shown in FIG. 17B. A driver IC 301 illustrated in FIG. 17B includes the circuits 300S and 300M and a circuit 300G. The circuit 300G is a gate driver. For example, when two driver ICs 301 are used to drive the pixel portion 114, the circuit 300G in one of the driver ICs 301 can operate as the gate driver 121 and the circuit 300G in the other driver IC 301 can operate as the gate driver 122. Both the driver IC 302 and the driver IC 300 can be used depending on the number of columns of the pixel portion 114.

As a driver IC for driving the pixel portion 110, a driver IC 302 (FIG. 17C) that does not include the circuit 300M can be used. As driver ICs for driving the pixel portion 110, not only the driver IC 302 but also the source driver IC 200 can be used depending on the number of columns of the pixel portion 110. When two driver ICs 302 are used to drive the pixel portion 110, the circuit 300G in one of the driver ICs 302 can operate as the gate driver 121 and the circuit 300G in the other driver IC 302 can operate as the gate driver 122.

<<Display Mode>>

The display device 100 can have three display modes. The first display mode is a mode for performing display with both the LC element DE1 and the EL element DE2 (hybrid mode). The second mode is a mode for performing display only with the LC element DE1 (LC mode). The third mode is a mode for performing display only with the EL element DE2 (EL mode). According to the display principles of the display module 150 in FIG. 3, the LC mode can be referred to as a reflective mode, and the EL mode as a self-luminous mode or a transmissive mode. Here, the operation of the display device 100 in each display mode will be described, with attention focused on the pins 40<1> to 40<12>.

The display mode can be determined by the control circuit 131, for example. The control circuit 131 determines the display module on the basis of a sensing signal of the sensor 135, an interrupt signal for the processor 130 based on the operation of a user or the like, etc. For example, the display module is set to the LC mode in bright environment (e.g., outdoors in fine weather in the daytime) and set to the EL mode in dark environment (e.g., outdoors at night). The display mode is set to the hybrid mode in environment with low-illuminance external light (e.g., illuminated indoors and outdoors in cloudy day), that is, in environment where favorable display quality is not obtained by using only light reflected by the LC element DE1.

Furthermore, the control circuit 131 transmits a control signal to the image processor 132 so that the determined display mode is executed. In accordance with the control signal, the image processor 132 generates a command signal and an image signal that correspond to the display mode and the structure of the display panel to be driven. Each display mode will be described below in detail, using an example where the connection between the pins 40<1> to 40<12> and the wirings SL1 and SL2 is as shown in FIG. 13.

<LC Mode>

When the display mode is set to the LC mode, the data signal DS that does not make the EL element DE2 emit light is input to the wiring SL2. In other words, the data signal DS for the EL element DE2 to express black is input to the wiring SL2. Thus, the data signal DS with a gray level of 0 is output from the pins 40<2>, 40<3>, 40<6>, 40<7>, 40<10>, and 40<11>.

<EL Mode>

When the display mode is set to the EL mode, the data signal DS for the LC element DE1 to express black is input to the wiring SL2. Thus, the data signal DS with a gray level of 0 (in the case where the LC element DE1 has a normally black mode) or 255 (in the case where the LC element DE1 has a normally white mode) is output from the pins 40<1>, 40<4>, 40<5>, 40<8>, 40<9>, and 40<12>.

<Hybrid Mode>

Because of the configuration of the pixel portion 110, analog signals that derive from one image data are input to the LC element DE1 and the EL element DE2 in each of the subpixels 10. The VGEN 231 generates an analog voltage suitable for driving the LC element DE1. Thus, when the signals DECP[7:0] with the same gray level are converted into analog signals by the MUXs 25N and 25P in the first column and those in the second column in one PTL 215, the EL element DE2 in the subpixel 10R<j,1> cannot emit light with appropriate luminance in some cases; hence, the display quality of the display device 100 degrades. In order to resolve such a defect, a data signal that is stored in the LATs 21 in columns where there is the pin 40 connected to the wiring SL2 (here, columns with the numbers 2, 3, 4, 7, 10, and 11) is made to have a gray level suitable for the EL element DE2.

(Gray Level Conversion Processing)

In view of the above, the image processor 132 executes processing for changing the gray level of an image signal as one type of processing for generating the image signals DP[7:0] and DN[7:0]. For example, a gray level conversion table that shows the correspondence between the gray level for the LC element DE1 and the gray level for the EL element DE2 is stored in the image processor 132, and the gray levels of the image signals DP[7:0] and DN[7:0] that correspond to the data signal DS for the EL element DE2 are converted by referring to the gray level conversion table.

In the hybrid mode, the luminance of the subpixel 10 is determined by the luminance of reflected light of the external light 5 from the LC element DE1 and the luminance of light emitted from the EL element DE2. Adjusting the luminance of the subpixel 10 in accordance with the brightness of usage environment enables increase in display quality of the display device 100 and reduction in power consumption. For such purposes, the luminance of the EL element DE2 is adjusted on the basis of a sensing signal of the sensor 135. For example, a plurality of gray level conversion tables corresponding to illuminances of usage environment are provided in the image processor 132, and a gray level conversion table to be referred to is determined by a sensing signal of the sensor 135.

Needless to say, for gray level conversion processing in the hybrid mode, the gray levels of the image signals DP[7:0] and DN[7:0] that correspond to the data signal DS for the LC element DE1 may be adjusted. Moreover, it is possible to prepare one or more gray level conversion tables for each of the LC mode and the EL mode and perform gray level conversion processing by the image processor 132 in each mode. Since the EL mode is a display mode executed in dark usage environment, the luminance of the EL element DE2 can be made lower than that in the hybrid mode. Thus, gray level conversion processing is effective in prolonging the lifetime of the EL element DE2.

Therefore, to improve the display quality of the display device 100, reduce power consumption, and prolong the lifetime of the EL element DE2, the number of gray level conversion tables and their data structures are determined in consideration of colors to be expressed, types of display elements, the display mode, the illuminance of usage environment, and the like. A gray level conversion table that the image processor 132 refers to is determined in accordance with the display mode of the display device 100 or the illuminance.

Here, processing using a gray level conversion table is described as an example of signal processing for changing the gray level of an image signal; however, a method of signal processing is not limited to this. In addition, the sensor 135 may be provided with a sensor that senses color temperature of the external light 5, in which case the gray level of an image signal can be adjusted in response to the illuminance of environment and color temperature.

(IDS Driving)

For still images, data of image signals for each frame is not changed, so that it is not necessary to rewrite data of the subpixel 10, particularly the subpixel 11 every frame. In view of this, to display still images in the LC mode, a driving method may be performed in which rewriting data of the subpixels 11 is temporarily stopped in a period longer than one frame period. Here, such a driving method is referred to as idling stop (IDS) driving.

Figure 18A:
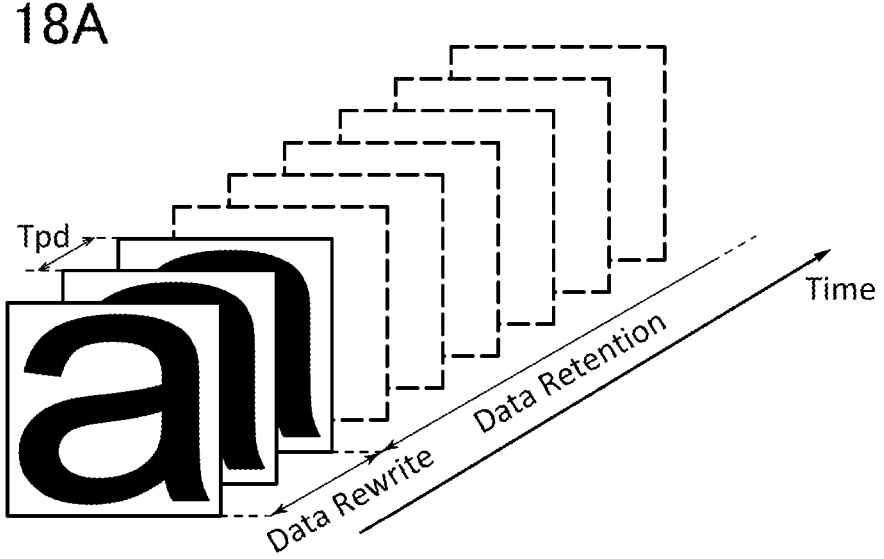
FIGS. 18A and 18B illustrate an example of the operation of a display device.
Figure 18B:
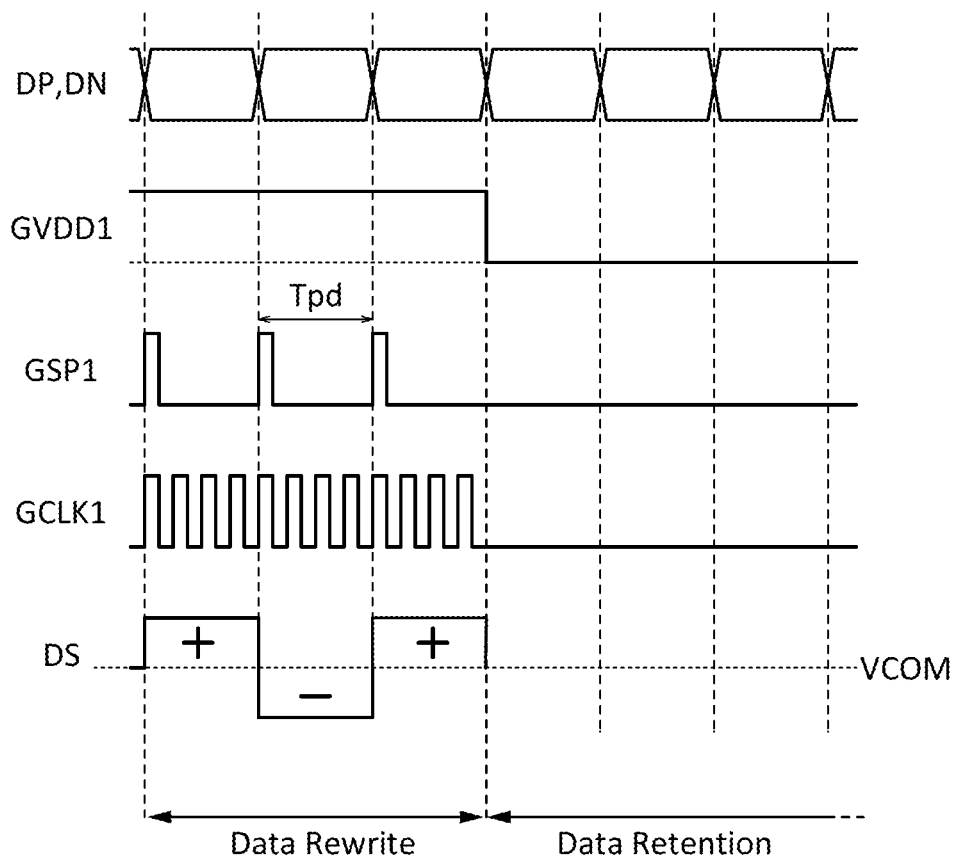

FIG. 18A shows a method of displaying a still image with IDS driving. FIG. 18B is a timing chart illustrating an example of IDS driving. In FIG. 18B, GVDD1 is high power supply voltage for the gate driver 121, and signals GSP1 and GCLK1 are a start pulse signal and a clock signal input to the gate driver 121.

In normal driving, data of the subpixel 11 is rewritten every frame period (period Tpd). When the signal GSP1 is input, the gate driver 121 generates a gate signal for selecting the wiring GL1, in accordance with the signal GCLK1 and outputs the gate signal to the wiring GL1. When the signal RES is input, the source driver IC 200 generates the signal DS from the image signals DP and DN and outputs the signal DS to the wiring SL1.

As illustrated in FIGS. 18A and 18B, processing with IDS driving is divided into data rewrite processing (also referred to as write processing) and data retention. First, data rewriting is performed once or more times at the same refresh rate as that of normal driving, whereby data is written to the subpixel 11. FIGS. 18A and 18B show an example where data is written three times. After the data writing, generation of gate signals for the wiring GL1 is stopped in the gate driver 121 to suspend data rewriting of the subpixel 11. In a data retention period, supply of GVDD to the gate driver 121 is stopped, whereby power consumption of the display device 100 can be reduced.

The frequency of data rewriting in data rewrite processing is determined in consideration of the refresh rate or the like. The data retention period in IDS driving is one second at the longest in consideration of burn-in of liquid crystal and is preferably approximately 0.5 seconds or less or 0.2 seconds or less.

The amount of charge leakage from the capacitor CS1 is preferably reduced as much as possible so that the display quality in IDS driving is kept the same as in normal driving. This is because the charge leakage causes a change in voltage applied to the LC element DE1, thereby changing the transmittance of the subpixel 11. For this reason, the transistor M1 is preferably a transistor with low off-state current. An example of such a transistor is a transistor in which a channel is formed using an oxide semiconductor (hereinafter referred to as OS transistor). The reason an OS transistor has lower off-state current than a Si transistor is that the bandgap of an oxide semiconductor is wider than those of Si and Ge (is 3.0 eV or more).

As an oxide contained in a semiconductor layer of an OS transistor, a metal oxide such as In—Sn—Ga—Zn oxide, In—Ga—Zn oxide, In—Sn—Zn oxide, In—Al—Zn oxide, Sn—Ga—Zn oxide, Al—Ga—Zn oxide, Sn—Al—Zn oxide, In—Zn oxide, Sn—Zn oxide, Al—Zn oxide, Zn—Mg oxide, Sn—Mg oxide, In—Mg oxide, In—Ga oxide, In oxide, Sn oxide, or Zn oxide can be used. In addition, these metal oxides may contain another material, such as Sift. An oxide semiconductor for an OS transistor preferably contains at least one of In and Zn.

By reducing impurities serving as electron donors, such as moisture or hydrogen, and also reducing oxygen vacancies, an i-type (intrinsic) or a substantially i-type oxide semiconductor is obtained. Here, such an oxide semiconductor is referred to as a highly purified oxide semiconductor. By forming the channel using a highly purified oxide semiconductor, the off-state current of an OS transistor that is normalized by channel width can be as low as several yoctoamperes per micrometer to several zeptoamperes per micrometer.

The reason the off-state current of an OS transistor is extremely low is that the bandgap of a semiconductor made of a metal oxide is 3.0 eV or more. Since an OS transistor contains a metal oxide in its channel formation region, leakage current due to thermal excitation is low and the off-state current is extremely low.

An oxide semiconductor suitable for an OS transistor has a hydrogen concentration that is measured by secondary ion mass spectrometry (SIMS) of lower than or equal to $2\times10^{20}$ atoms/cm$^3$, preferably lower than or equal to $5\times10^{19}$ atoms/cm$^3$, more preferably lower than or equal to $1\times10^{19}$ atoms/cm$^3$, more preferably lower than $5\times10^{18}$ atoms/cm$^3$, more preferably lower than or equal to $1\times10^{18}$ atoms/cm$^3$, more preferably lower than or equal to $5\times10^{17}$ atoms/cm$^3$, still more preferably lower than or equal to $1\times10^{16}$ atoms/cm$^3$.

The display device 100 that displays still images with IDS driving is preferably used to read e-books, view photographs taken with a digital camera, and the like. That is, still images are preferably displayed with IDS driving when the display device 100 is used to display the same image for a relatively long time and images on the entire screen are switched by the operation of a user. Since the frequency of image switching can be reduced with IDS driving, IDS driving is effective in reducing flickers at the time of image switching.

IDS driving can be performed not only in the LC mode but also in the hybrid mode. When still images are displayed in the hybrid mode, data of the subpixel 11 can be rewritten with IDS driving while data of the subpixel 12 is rewritten every frame period.

Since the display device 100 has three display modes (the LC, EL, and hybrid modes) corresponding to the illuminance of usage environment, it can display images with high quality (high contrast and high color reproducibility) regardless of the weather (fine, rainy, or cloudy weather), time (day or night), or the like. The display device 100 is therefore suited for a display portion of a portable electronic device used at various places. Another reason the display device 100 is suitable for a display portion of a portable electronic device is that the display device of Embodiment 1 can achieve low power consumption and thus the operating time of the electronic device that operates with a battery can be prolonged.

Needless to say, the display device 100 can be applied to display portions of various electronic devices other than portable electronic devices. Embodiment 2 will show some specific examples of electronic devices to which the display device 100 can be applied.

Embodiment 2

In this embodiment, electronic devices or the like provided with a display portion will be described.

Examples of electronic devices include a television set (also referred to as television or television receiver), a monitor of a computer or the like, a digital camera, a digital video camera, a digital photo frame, a mobile phone (also referred to as cellular phone or mobile phone device), a portable game machine, a portable information appliance, an audio reproducing device, and a large game machine such as a pinball machine. A flexible electronic device can be incorporated along a curved inside/outside wall surface of a construction such as a house or a building or a curved interior/exterior surface of a car. FIGS. 19A to 19F, FIGS. 20A to 20D, and FIGS. 21A and 21B illustrate structure examples of electronic devices. For display portions of the electronic devices in FIGS. 19A to 19F, FIGS. 20A to 20D, and FIGS. 21A and 21B, the display device of Embodiment 1 and a touch panel in which a touch sensor is provided in the display device of Embodiment 1 can be used.

Figure 19A:
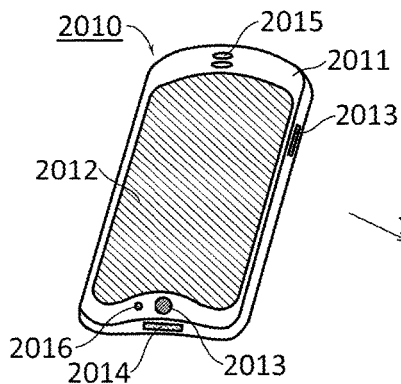
FIGS. 19A to 19F each illustrate a structure example of an electronic device.

An information appliance 2010 illustrated in FIG. 19A includes a display portion 2012 incorporated into a housing 2011, an operation button 2013, an external connection port 2014, a speaker 2015, and a microphone 2016. Here, a display region of the display portion 2012 is curved. The information appliance 2010 is a portable information appliance driven with a battery and can be used as a tablet information appliance or a smartphone. The information appliance 2010 has functions such as phone calls, e-mailing, an appointment organizer, Internet communication, and music reproduction. Information can be input by touching the display portion 2012 with a finger or the like. Operations such as making a call and inputting letters can be performed by touching the display portion 2012 with a finger or the like. The information appliance 2010 can be operated by inputting sound from the microphone 2016. Power on/off operation, screen switching of the display portion 2012, and the like can be performed by pressing the operation button 2013. For example, the screen can be switched from a mail creation screen to a main menu screen.

Figure 19B:
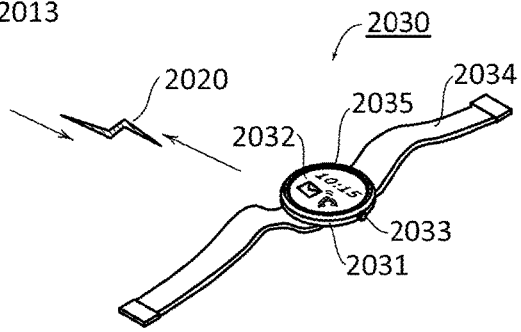

FIG. 19B illustrates an example of a watch-type information appliance. An information appliance 2030 includes a housing 2031, a display portion 2032, a winding crown 2033, a belt 2034, and a sensing unit 2035. The information appliance 2030 can be operated by rotating the winding crown 2033. The display portion 2032 may include a touch panel, in which case the information appliance 2030 can be operated by touching the display portion 2032 with a finger or the like.

The sensing unit 2035 has a function of obtaining information on usage environment and user's biological information. The sensing unit 2035 at least includes an illumination sensor. Other than an illumination sensor, the sensing unit 2035 may be provided with a microphone, an imaging element, an acceleration sensor, a direction sensor, a pressure sensor, a temperature sensor, a humidity sensor, a positioning sensor (e.g., a global positioning system (GPS)), or the like.

Wireless communication devices with the same standard may be incorporated into the information appliance 2010 and the information appliance 2030 so that interactive communication is possible through radio 2020. Accordingly, when the information appliance 2010 receives an incoming e-mail or call, for example, information notifying the incoming e-mail or call can be displayed on the display portion 2032 of the information appliance 2030.

Figure 19C:
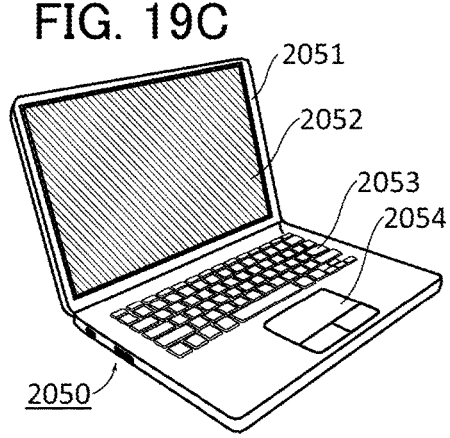

A notebook personal computer 2050 illustrated in FIG. 19C includes a housing 2051, a display portion 2052, a keyboard 2053, and a pointing device 2054.

Figure 19D:
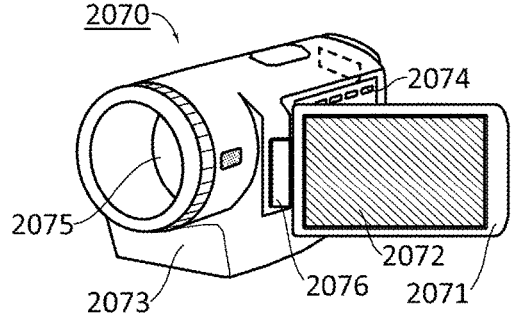

A video camera 2070 illustrated in FIG. 19D includes a housing 2071, a display portion 2072, a housing 2073, an operation key 2074, a lens 2075, and a joint 2076. The display portion 2072 is provided in the housing 2071. The operation key 2074 and the lens 2075 are provided in the housing 2073. The housing 2071 and the housing 2073 are connected to each other with the joint 2076, and the angle between the housing 2071 and the housing 2073 can be changed with the joint 2076. Images on the display portion 2072 may be switched in accordance with the angle between the housing 2071 and the housing 2073 at the joint 2076.

Figure 19E:
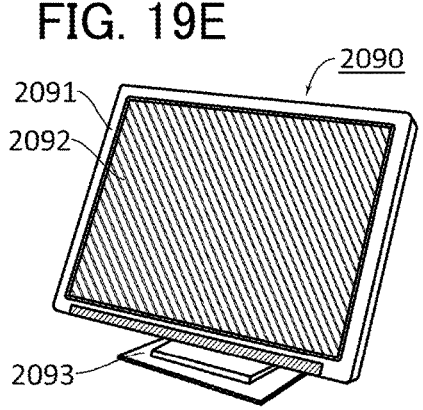

A display device 2090 illustrated in FIG. 19E includes a housing 2091, a display portion 2092, a support base 2093, and the like. The display device 2090 can be used as a monitor for a computer, a game machine, or the like. When a receiver for television broadcasting is incorporated into the display device 2090, the display device 2090 can operate as a television (TV) receiver.

Figure 19F:
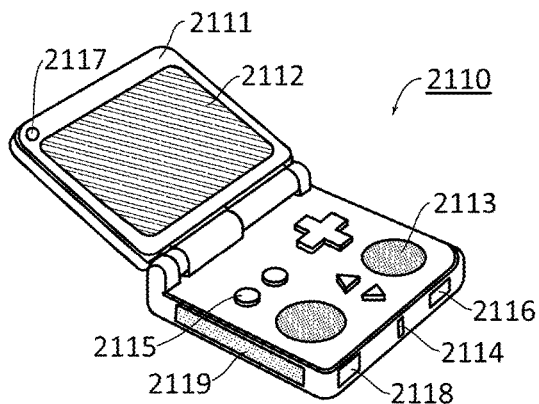

A portable game machine 2110 illustrated in FIG. 19F includes a housing 2111, a display portion 2112, a speaker 2113, an LED lamp 2114, an operation key 2115, a connection terminal 2116, a camera 2117, a microphone 2118, and a recording medium read portion 2119.

Figure 20A:
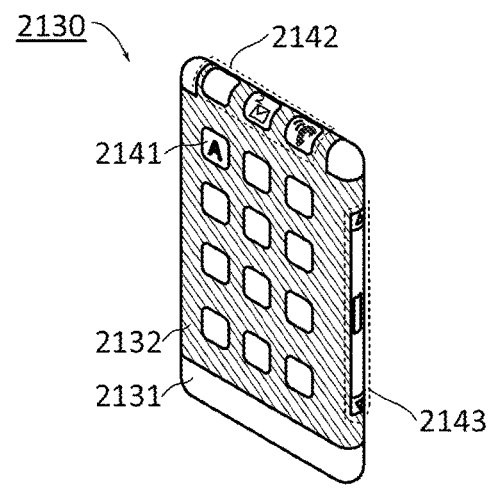
FIGS. 20A to 20D illustrate structure examples of electronic devices.

An information appliance 2130 illustrated in FIG. 20A includes a housing 2131 and a display portion 2132. The information appliance 2130 is a portable information appliance driven with a battery and can be used as a smartphone, a tablet information appliance, or the like. The information appliance 2130 has functions such as phone calls, e-mailing, an appointment organizer, Internet communication, and music reproduction. Since the display portion 2132 is curved, the information appliance 2130 can display information on at least three surfaces. Here, information 2141, information 2142, and information 2143 are displayed on different surfaces of the display portion 2132. For example, a user can see the display (here, the information 2142) on the upper edge portion of the display portion 2132 with the information appliance 2130 put in a breast pocket. Thus, the user can see the information 2142 without taking out the information appliance 2130 from the pocket and decide whether to answer the call.

Examples of the information 2141 to 2143 include notification from a social networking service (SNS), display indicating reception of an e-mail or an incoming call, the title of an e-mail or the like, the sender of an e-mail or the like, the date, the time, remaining battery, and the reception strength of an antenna.

Figure 20B:
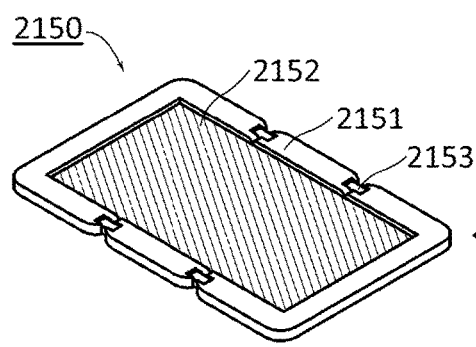
Figure 20C:
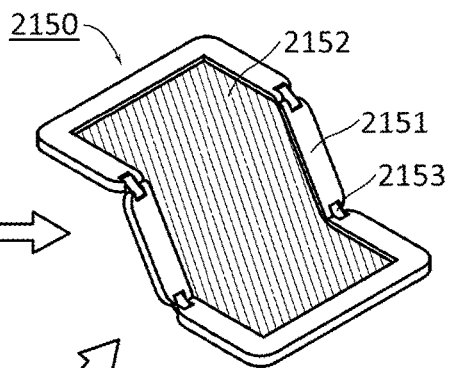
Figure 20D:
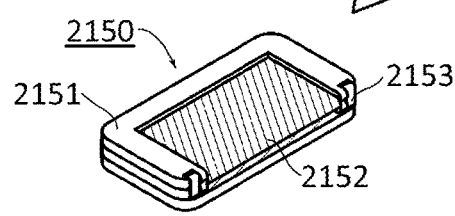

FIG. 20B illustrates a structure example of a foldable information appliance. An information appliance 2150 illustrated in FIG. 20B includes housings 2151, a display portion 2152, and hinges 2153. The information appliance 2150 is also a portable information appliance and has functions similar to those of the information appliance 2130. FIG. 20B illustrates the information appliance 2150 in an unfolded state. FIG. 20D illustrates the information appliance 2150 in a folded state. FIG. 20C illustrates the information appliance 2150 that is being opened or folded. The portability of the information appliance 2150 is increased in a folded state and a large display screen is obtained in an unfolded state, resulting in higher convenience of the information appliance 2150.

The display portion 2152 is supported by eight housings 2151 joined together by the hinges 2153. By folding the information appliance 2150 at a connection portion between two housings 2151 with the hinges 2153, the information appliance 2150 can be reversibly changed in shape from an unfolded state to a folded state. The display portion 2152 can be bent with a radius of curvature of 1 mm to 150 mm, for example.

The information appliance 2150 may be provided with a sensor which senses that the display portion 2152 is in a folded state (FIG. 20D) and supplies sensing data. Similarly, the sensor may sense that the display portion 2152 is in an unfolded state (FIG. 20B). When the sensor senses that the display portion 2152 is in a folded state, display on a folded portion (or a portion where a user cannot see because of a folded state) may be stopped, or sensing by a touch sensor may be stopped. Furthermore, display and sensing by a touch sensor may be controlled to be restarted when data indicating that the display portion 2152 is unfolded is obtained.

Figure 21A:
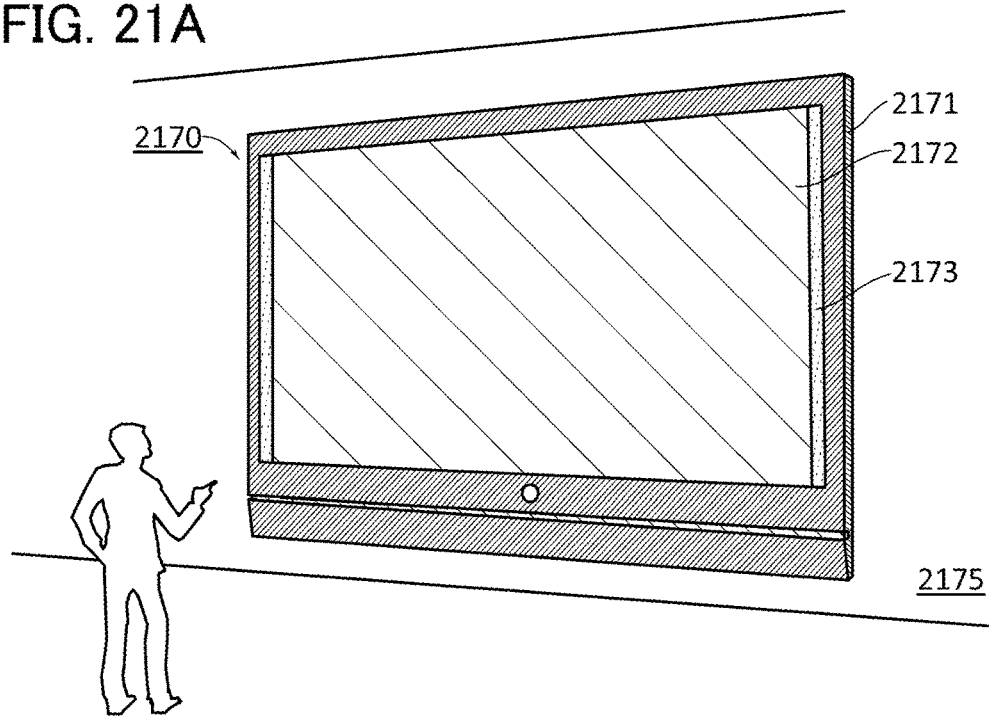
FIGS. 21A and 21B each illustrate a structure example of an electronic device.
Figure 21B:
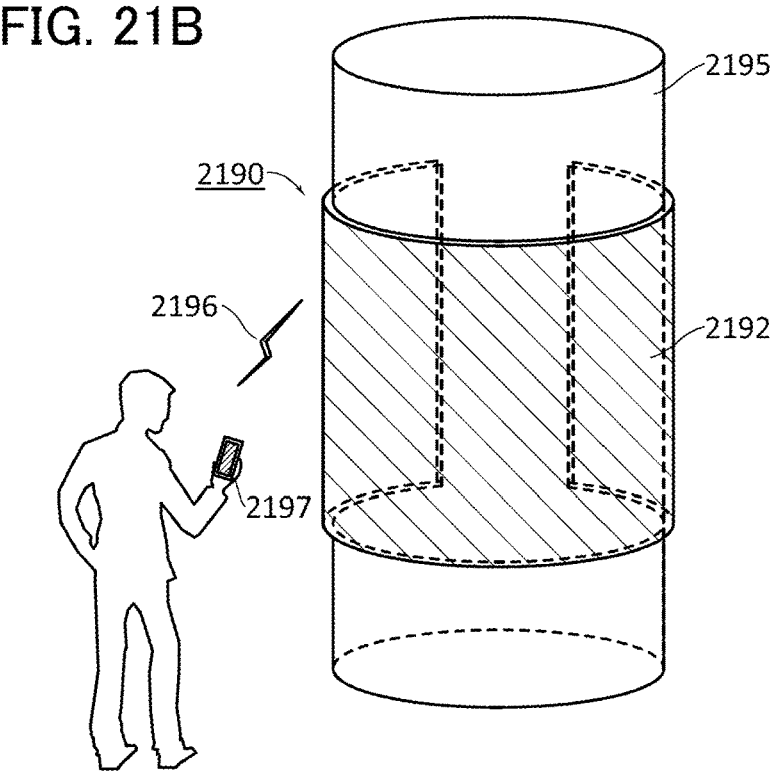

FIGS. 21A and 21B illustrate structure examples of electronic signboards (also referred to as digital signage). Digital signage 2170 illustrated in FIG. 21A includes a housing 2171, a display portion 2172, and a speaker 2173. Since the display device of Embodiment 1 can be lightweight and thin, the size of the display portion 2172 can be easily increased. Thus, even with the increased size of the display portion 2172, there are few limitations on a place where the digital signage 2170 is installed. FIG. 21A illustrates an example where the digital signage 2170 is attached to a wall surface 2175. The digital signage 2170 is not necessarily installed in such a manner and may be suspended from the ceiling. When a flexible display panel is used for the display portion 2172, the digital signage can be installed while being curved. Such an example is shown in FIG. 21B.

Digital signage 2190 illustrated in FIG. 21B is attached to a cylindrical column 2195. Reference numeral 2192 denotes a display portion of the digital signage 2190. The digital signage 2190 may be provided with a wireless communication device, in which case information to be displayed can be transmitted to the digital signage 2190 through radio. Moreover, information (e.g., displayed information and information related to the displayed information) can be transmitted from the digital signage 2190 to an information appliance 2197 through radio 2196. When the digital signage 2170 is provided with a wireless communication device, it can operate in the same manner as the digital signage 2190.

Embodiment 3

In this embodiment, a hybrid display panel and a hybrid display module will be described. The display panel and the display module of this embodiment can be used for the display device of Embodiment 1.

<<Structure Example 1 of Display Module>>

Figure 22A:
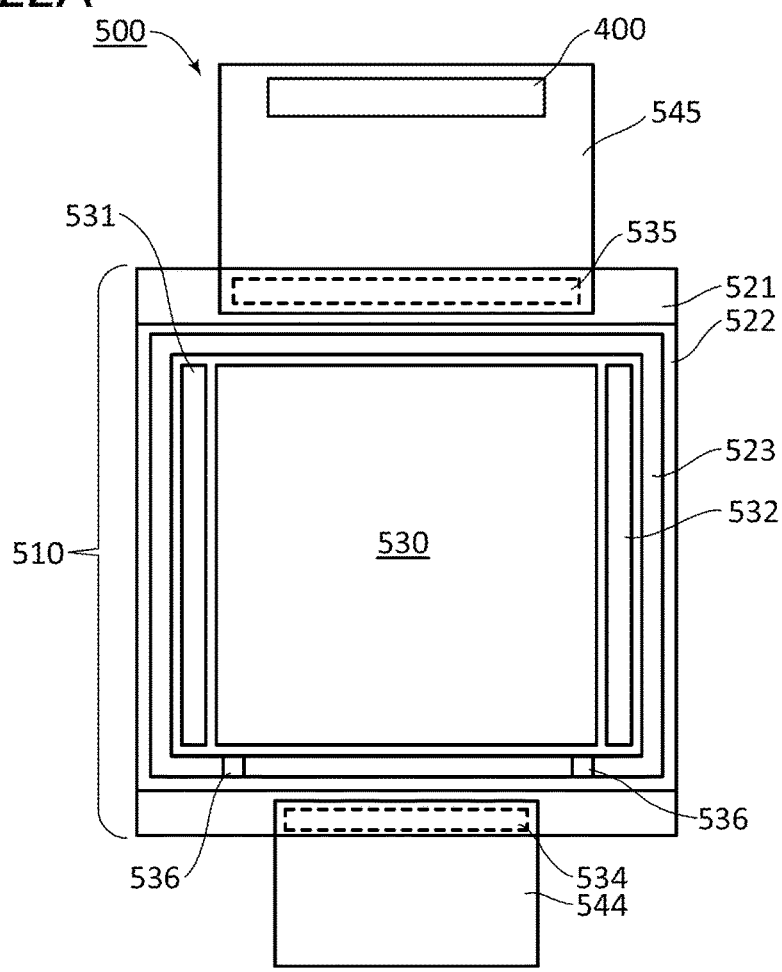
FIGS. 22A and 22B are plan views each illustrating a structure example of a display module.

FIG. 22A is a plan view illustrating a structure example of a display module. A display module 500 illustrated in FIG. 22A includes a source driver IC 400, a display panel 510, and FPCs 544 and 545. A cross-sectional structure of the display module 500 is similar to that of the display module 150 illustrated in FIG. 3. The display panel 510 includes a pair of substrate 521 and 522 and a sealant 523. The substrate 521 is a support substrate for a transistor layer and an EL element layer. A pixel portion 530, gate drivers (GD) 531 and 532, and terminal portions 534 and 535 are provided in the transistor layer.

Here, the pixel portion 530 has a structure similar to that of the pixel portion 110 illustrated in FIGS. 5A and 5C, and the pixel 13 is composed of three (RGB) subpixels 10. The GD 531 is a circuit for driving the wirings GL1, and the GD 532 is a circuit for driving the wirings GL2. Each of the GDs 531 and 532 can be constituted by a shift register where a plurality of flip-flops are electrically connected to each other. When the pixel portion 530 has the same circuit configuration as the pixel portion 110, the GD 531 and the GD 532 may have the same circuit configuration.

The substrate 521 has a function of supporting the common electrode of the subpixel 11 (pixel for LC) and a color filter. The sealant 523 has a function of attaching the substrate 521 and the substrate 522. A liquid crystal layer is sealed between the substrate 521 and the substrate 522 with the sealant 523.

Each of the terminal portions 534 and 535 includes a plurality of terminals. The FPC 544 is electrically connected to the terminal portion 534. Signals and voltages are input to the pixel portion 530 and the GDs 531 and 532 through the FPC 544. The FPC 545 is electrically connected to the terminal portion 535, and the source driver IC 400 is electrically connected to the FPC 545. The FPC 545 has a function of electrically connecting the source driver IC 400 and the pixel portion 530 and a function of inputting signals, voltages, and the like to the source driver IC 400.

In the transistor layer, a common contact portion 536 is provided in a region where the sealant 523 is formed. The common contact portion 536 is provided to electrically connect the common electrode of the LC element DE1 provided on the substrate 522 and the terminal portion 534 provided on the substrate 521. Note that the common contact portion 536 can also be provided in a region on the inner side of the sealant 523. Providing the common contact portion 536 in the region where the sealant 523 is formed is effective in narrowing the frame of the display panel 510.

<<Structure Example 2 of Display Module>>

Figure 22B:
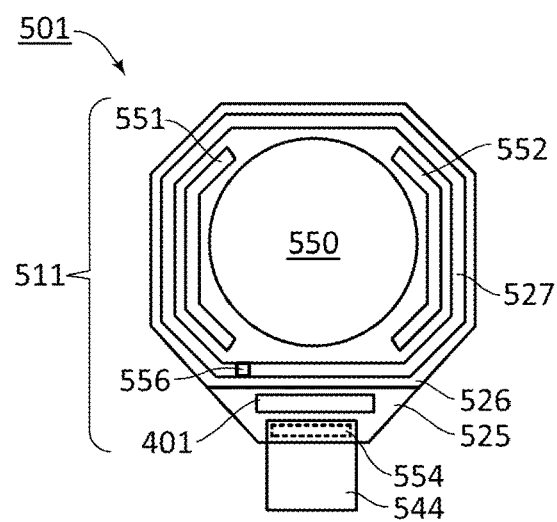

Although the display panel 510 has a rectangular display region, a display region is not limited to being rectangular and may be circular. Such an example is shown in FIG. 22B. A display module 501 illustrated in FIG. 22B can be used for the display portion 2032 of the information appliance 2030 in FIG. 19B.

The display module 501 includes a source driver IC 401, a display panel 511, and the FPC 544. The display panel 511 includes substrates 525 and 526, a sealant 527, a pixel portion 550, a GD 551, a GD 552, a terminal portion 554, and a common contact portion 556.

In the plan view, the pixel portion 550 is circular and the substrates 525 and 526 are octagonal. The GD 551 is bent along the edge portion of the substrate 521. The same applies to the GD 552. The GD 551 is a circuit for driving the wirings SL1, and the GD 552 is a circuit for driving the wirings SL2. The source driver IC 401 is mounted on the display panel 511 by a COG method. The FPC 544 is electrically connected to the terminal portion 554. Signals and power supply voltage that are input from the outside are supplied to the pixel portion 550, the GDs 551 and 552, and the source driver IC 401 through the FPC 544.

<<Display Module 500 and Display Panel 510>>

A more specific structure of the display module 500, particularly the display panel 510 will be described below with reference to FIGS. 23A to 23C, FIG. 24, and FIG. 25. Here, the pixel portion 530 consists of the subpixels 10.

Figure 23A:
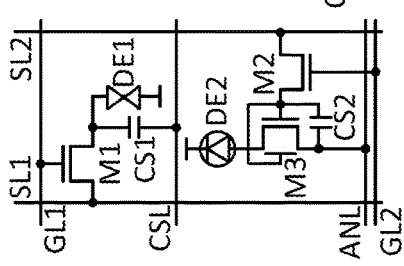
FIG. 23A is a circuit diagram illustrating a configuration example of a subpixel.
Figure 23B:
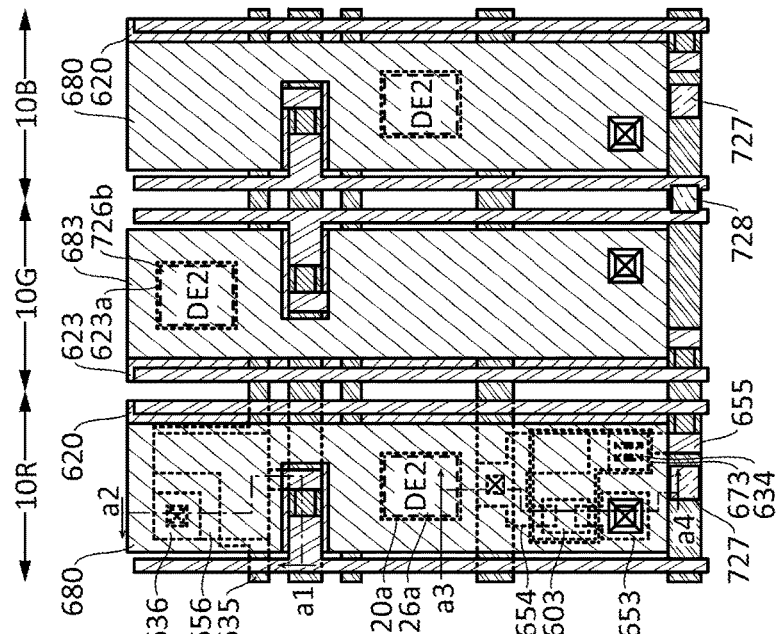
FIGS. 23B and 23C are layout diagrams illustrating a structure example of subpixels.
Figure 23C:
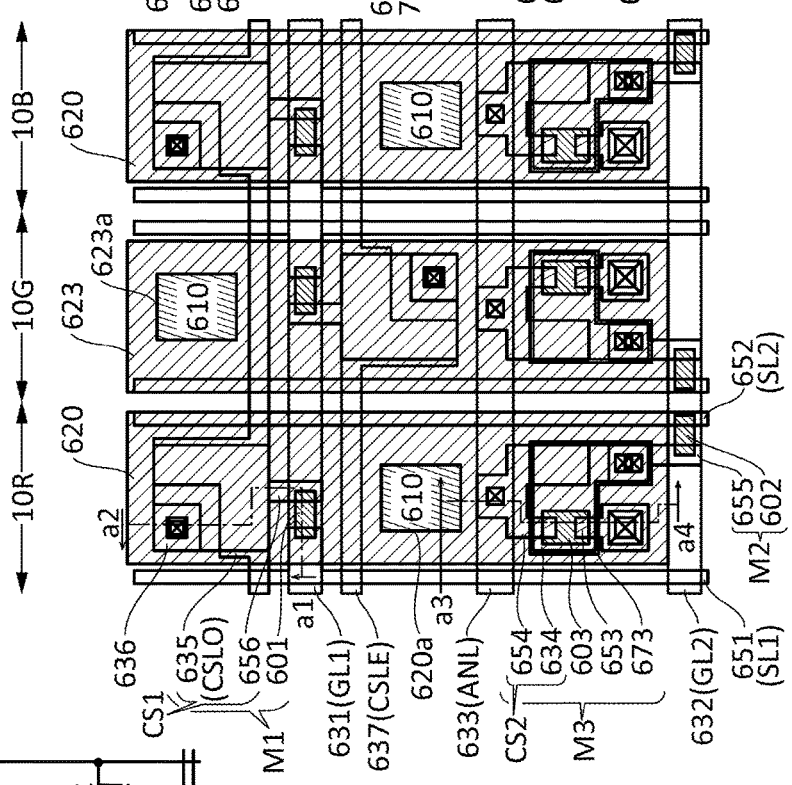

FIGS. 23B and 23C illustrate a layout example of three subpixels 10 (10R, 10G, 10B). These three subpixels 10 constitute one pixel 13. Although it is already shown in another diagram, the circuit diagram of the subpixel 10 is shown in FIG. 23A for easy understanding of this embodiment.

Figure 24:
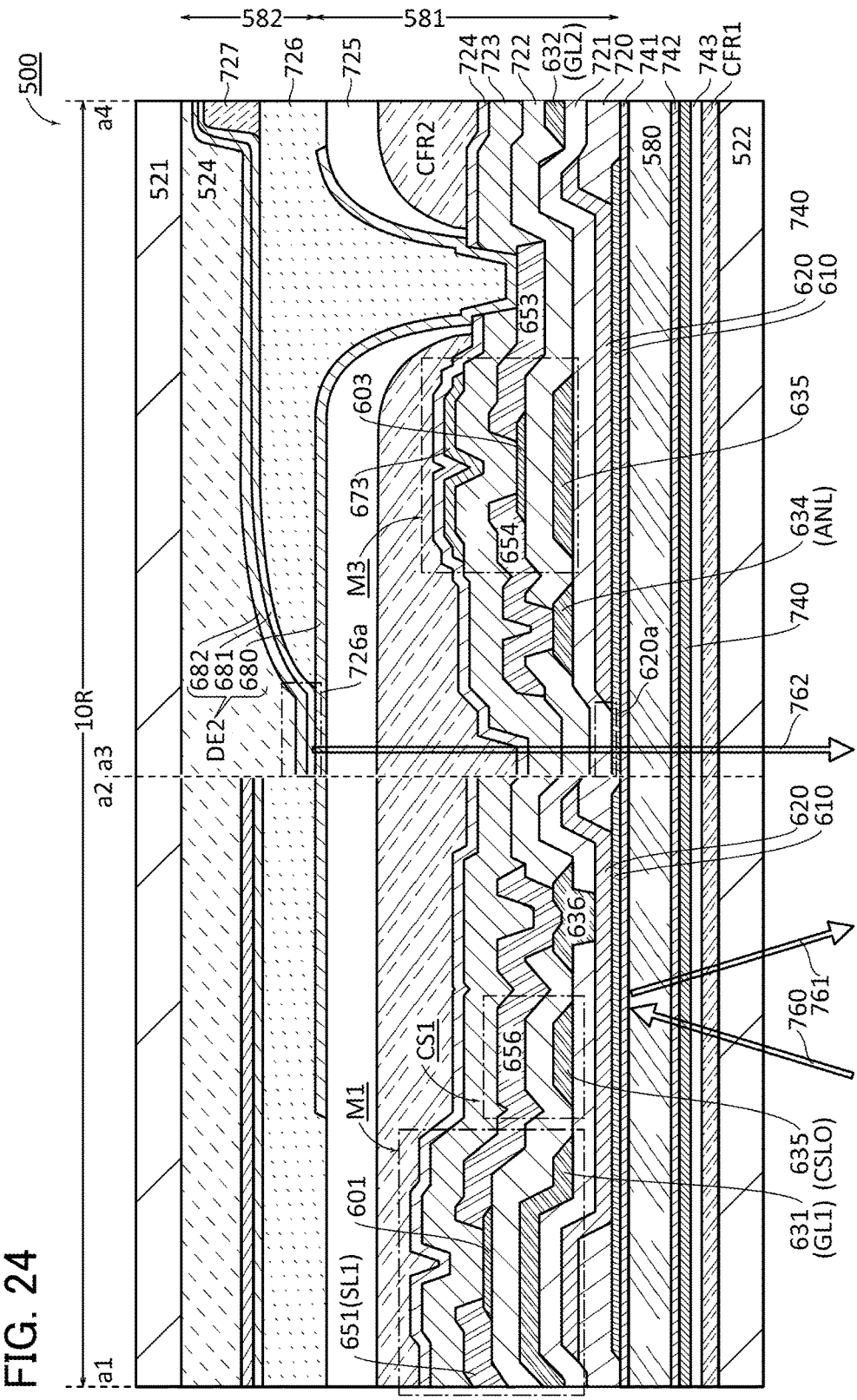
FIG. 24 is a cross-sectional view illustrating a structure example of a display module (a subpixel)
Figure 25:
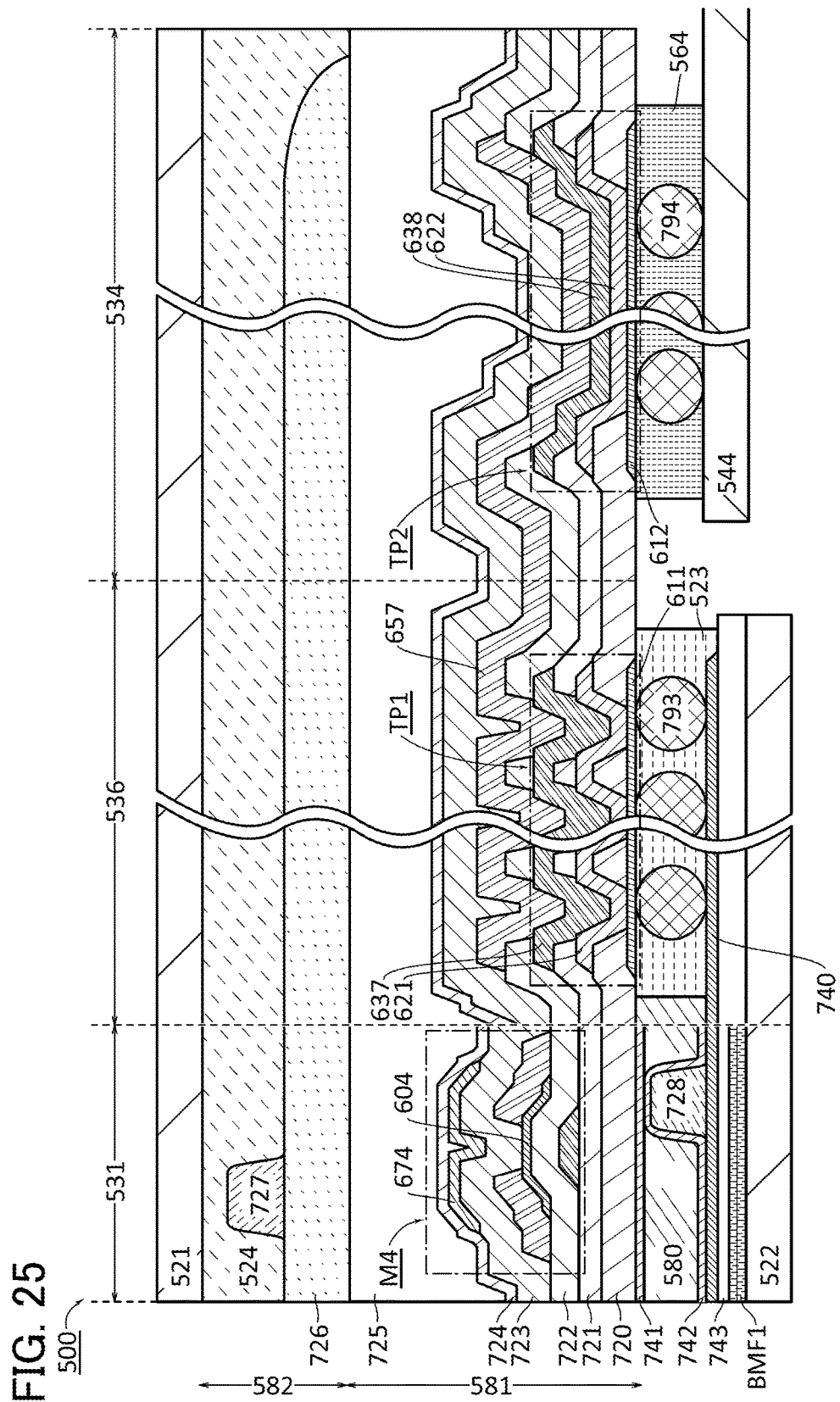
FIG. 25 is a cross-sectional view illustrating a structure example of a display module (a gate driver, a common contact portion, and a terminal portion)

FIGS. 24 and 25 are cross-sectional views illustrating a structure example of the display module 500. In FIGS. 24 and 25, the substrate 522, a liquid crystal layer 580, a transistor layer 581, an EL element layer 582, and the substrate 521 are stacked in this order, which is different from the stack order in FIG. 3. FIGS. 23B and 23C illustrate a layout example of components provided in the transistor layer 581 and the EL element layer 582 of the subpixels 10. FIG. 23B illustrates a layout example of components provided below the EL pixel electrode, and some of the components are marked with a hatch pattern. FIG. 23C also shows an insulating layer 728 provided over the substrate 522.

In the layout example of FIGS. 23B and 23C, the wirings CSL are different between an odd-numbered column and an even-numbered column. The wiring CSL in an odd-numbered column is a wiring CSLO and the wiring CSL in an even-numbered column is a wiring CSLE in order that arrangement of a light-emitting region of the EL element DE2 is made different between odd-numbered and even-numbered columns. In a region where the capacitor CS1 of the subpixel 10 in an even-numbered column is formed, a light-emitting region of the EL element DE2 of the subpixel 10 in an odd-number column is formed. Meanwhile, in a region where a light-emitting region of the EL element DE2 of the subpixel 10 in an even-number column is formed, the capacitor CS1 of the subpixel 10 in an odd-numbered column is formed. As has been described in Embodiment 1, a region where light from the EL element DE2 is extracted in the subpixel 10 is defined by an opening in the pixel electrode of the LC element DE1. Here, a conductive layer 620 is the pixel electrode in an odd-numbered column, and a conductive layer 623 is the pixel electrode in an even-numbered column. An opening 620a in the conductive layer 620 is provided between the wiring GL1 and the wiring ANL. An opening 623a in the conductive layer 623 is provided between the wiring GL2 in an adjacent row and the wiring GL1. In the plan view, the shape of the pixel electrode of the EL element ED2 is different between odd-numbered and even-numbered columns. Here, a conductive layer 680 is the pixel electrode in an odd-numbered column, and a conductive layer 683 is the pixel electrode in an even-numbered column.

In this embodiment, the column of the subpixel 10R is referred to as an odd-numbered column and the column of the subpixel 10B is referred to as an even-numbered column for convenience; alternatively, the column of the subpixel 10R may be regarded as an even-numbered column.

FIG. 24 illustrates a cross-sectional structure of the subpixel 10R and specifically a cross-sectional view of the subpixel 10R along the line a1-a2 and the line a3-a4. The subpixels 10G and 10B have a similar cross-sectional structure to that of the subpixel 10R. FIG. 25 illustrates a cross-sectional structure of the GD 531, the common contact portion 536, and the terminal portion 534 and shows a transistor M4 as a representative component of the GD 531.

<Transistor Layer 581 and EL Element Layer 582>

The transistor layer 581 includes semiconductor layers 601 to 604, conductive layers 610 to 612, conductive layers 620 to 623, conductive layers 631 to 638, conductive layers 651 to 657, conductive layers 680 and 683, insulating layers 720 to 725, and a color filter layer CFR2. The EL element layer 582 includes insulating layers 726 and 727, an EL layer 681, and a conductive layer 682.

There is no particular limitation on device structures of various elements such as transistors and capacitors provided in the transistor layer 581. Device structures are selected to be suited for the functions of the pixel portion 530 or the GDs 531 and 532. Examples of the device structure of a transistor are a top-gate structure, a bottom-gate structure, a dual-gate structure provided with both a gate (front gate) and a bottom gate, and a multi-gate structure including a plurality of gate electrodes for one semiconductor layer. There is no particular limitation on types (e.g., a composition and a crystal structure) of a semiconductor contained in an active layer (channel formation region) of a transistor. A semiconductor used for the active layer included is roughly divided into a single crystal semiconductor and a non-single-crystal semiconductor. Examples of a non-single-crystal semiconductor include a polycrystalline semiconductor, a microcrystalline semiconductor, and an amorphous semiconductor. Examples of a semiconductor material include a semiconductor containing one or more kinds of Group 14 elements such as Si, Ge, or C (e.g., silicon, silicon germanium, and silicon carbide), an oxide semiconductor, and a compound semiconductor such as gallium nitride.

In the example shown here, the pixel portion 530 and the GDs 531 and 532 are formed using transistors with the same conductivity type; the transistors M1 to M4 provided in the transistor layer 581 are n-channel transistors and OS transistors. Here, the transistors M1 to M4 have a bottom-gate structure. The transistors M1 and M2 are OS transistors without a backgate. The transistor M3 is an OS transistor with a backgate. The transistor M4 is an OS transistor that has a device structure similar to that of the transistor M3, and a backgate and a gate of the transistor M4 are electrically connected to each other. Channel formation regions of the transistors M1 to M4 are placed in the respective semiconductor layers 601 to 604.

To fabricate the transistor layer 581 and the EL element layer 582, a substrate for fabricating transistors that is different from the substrate 521 and 522 (here this substrate is referred to as temporary substrate) is used. As the temporary substrate, mother glass for manufacturing EL display panels can be used, for example. A separation layer is formed over the temporary substrate, the transistor layer 581 is formed over the separation layer, and the EL element layer 582 is formed over the transistor layer 581. The substrate 521 is fixed above the EL element layer 582 by the sealant 524. Then, the temporary substrate together with the separation layer is separated from the transistor layer 581. Next, the cell process similar to that in the process for manufacturing a liquid crystal display panel is performed. An alignment film 741 is formed on a surface of the transistor layer 581 exposed by the separation step. A conductive layer 740, an alignment film 742, and the like are formed over the substrate 522. Subsequently, the liquid crystal layer 580 is sealed between the transistor layer 581 and the substrate 522 with the sealant 523.

As the sealant 523, a reactive curable adhesive, a photocurable adhesive, a thermosetting adhesive, or an anaerobic adhesive can be used, for example. Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, or the like can be used for the sealant 523.

The insulating layer 720 functions as a passivation film for the transistor layer 581. The insulating layer 721 functions as a base insulating layer of the transistors M1 to M4. The conductive layer 620 is the pixel electrode of the LC element DE1 and has the opening 620a. The conductive layer 621 is included in a terminal TP1 of the common contact portion 536. The conductive layer 622 is included in a terminal TP2 of the terminal portion 534. The terminal portion 534 includes a plurality of terminals TP2.

The conductive layers 610 to 612 function as etching stop layers in a step of etching the insulating layer 720. Through the etching step, an opening is provided in the insulating layer 720 in a region where the conductive layers 620 to 622 are formed. The conductive layers 610 to 612 can prevent the separation layer from being damaged in the etching step.

For example, when a tungsten layer is used as the separation layer, the conductive layers 610 to 612 can be formed using In—Ga—Zn oxide. The conductive layers 610 to 612 function as protective layers for the conductive layers 620 to 623 in a step of separating the temporary substrate. The conductive layers 610 to 612 are formed using a conductive material that is easily separated from the separation layer, whereby the temporary substrate can be separated without damaging the conductive layers 620 to 623. Moreover, providing the conductive layers 610 to 612 leads to fewer limitations on a conductive material used for the conductive layers 620 to 623.

The conductive layers 630 to 638 are provided over the insulating layer 721. The conductive layer 631 constitutes the wiring GL1 and has a region functioning as a gate electrode of the transistor M1. The conductive layer 632 constitutes the wiring GL2 and has a region functioning as a gate electrode of the transistor M2. The conductive layers 633, 635, and 637 constitute the wirings ANL, CSLO, and CSLE, respectively. The conductive layer 636 is electrically connected to the conductive layer 620.

The conductive layers 651 to 657 are provide over the insulating layer 722. The insulating layer 722 constitutes gate insulating layers of the transistors M1 to M4. The conductive layer 651 constitutes the wiring SL1 and has regions functioning as a source electrode and a drain electrode of the transistor M1. The conductive layer 652 constitutes the wiring SL2 and has regions functioning as a source electrode and a drain electrode of the transistor M2. The conductive layers 653 and 654 constitute a source electrode and a drain electrode, respectively, of the transistor M3. The conductive layer 654 is electrically connected to the conductive layer 633. The conductive layer 655 constitutes a source electrode and a drain electrode of the transistor M2 and is electrically connected to the conductive layer 634. The conductive layer 656 constitutes a source electrode and a drain electrode of the transistor M1 and is electrically connected to the conductive layer 636.

A region where the conductive layer 635, the insulating layer 722, and the conductive layer 656 overlap functions as the capacitor CS1. A region where the conductive layer 634, the insulating layer 722, and the conductive layer 654 overlap functions as the capacitor CS2. In an even-numbered column, a region where the conductive layer 637, the insulating layer 722, and the conductive layer 656 overlap functions as the capacitor CS1.

The insulating layers 723 and 724 function as passivation films for the transistors M1 to M4. The conductive layers 673 and 674 are provided over the insulating layer 723. The conductive layer 673 is a backgate electrode of the transistor M3 and is electrically connected to the conductive layer 655. That is, the backgate electrode and the gate electrode of the transistor M3 are electrically connected to each other through the conductive layer 655. The conductive layer 674 is a backgate electrode of the transistor M4. As in the transistor M3, the gate electrode and the backgate electrode of the transistor M4 are electrically connected to each other through a conductive layer that is positioned at the same layer level as the conductive layer 655.

The color filter layer CFR2 is provided to cover the insulating layer 723. The color filter layer CFR2 is a color filter layer for the EL element DE2. The color filter layer for the EL element DE2 can be provided as appropriate. The color filter layer CFR2 is a red color filter layer corresponding to the color of the subpixel 10R. Green and blue color filter layers are provided for the subpixels 10G and 10B, respectively. The insulating layer 725 is provided to cover the color filter layer. The insulating layer 725 functions as a planarization film. Thus, the insulating layer 725 is preferably formed using a resin such as a polyimide resin or an acrylic resin.

The conductive layer 680 is provided over the insulating layer 725. The conductive layer 680 is the pixel electrode of the EL element DE2. The conductive layer 680 is electrically connected to the conductive layer 653. The insulating layer 726 is provided to cover the conductive layer 680. The insulating layer 727 is provided over the insulating layer 726. The insulating layer 727 functions as a spacer for maintaining a space between the substrate 521 and the EL element layer 582. The EL layer 681 and the conductive layer 682 are stacked over the insulating layers 726 and 727. The conductive layer 682 is the common electrode of the EL element DE2. The insulating layer 726 has an opening 726a in a region overlapping the opening 620a in the conductive layer 620. The conductive layer 680 is exposed at the opening 726a. A stack of the conductive layer 680, the EL layer 681, and the conductive layer 682 that is formed in the opening 726a constitutes the light-emitting region of the EL element DE2 in an odd-numbered column.

Like the conductive layer 680, the conductive layer 683 is provided over the insulating layer 725. A stack of the conductive layer 683, the EL layer 681, and the conductive layer 682 that is formed in an opening 726b constitutes the light-emitting region of the EL element DE2 in an even-numbered column.

The EL layer 681 contains at least a light-emitting material capable of emitting light by recombination of holes and electrons. The EL layer 681 may include a functional layer such as a hole-injection layer, a hole-transport layer, an electron-transport layer, or an electron-injection layer. Here, the EL layer 681 emits light with the color of the subpixel 10. Alternatively, all the subpixels 10 may be provided with the EL layer 681 that emits white light. Providing the EL layer 681 that emits light with the color of the subpixel 10 leads to lower power consumption because light 762 from the EL element DE2 can be efficiently extracted from the substrate 522. Furthermore, the display quality (contrast and color reproducibility) of the display panel 510 can be improved.

<Substrate 522 (Counter Substrate)>

The substrate 522 corresponds to the counter substrate of the LC display panel. The substrate 522 is provided with the insulating layer 728, the conductive layer 740, the alignment film 742, an overcoat layer 743, a color filter layer CFR1, and a light-blocking layer BMF1.

The insulating layer 728 functions as a spacer for maintaining a space between the substrate 522 and the substrate 521 (the transistor layer 581). The conductive layer 740 is the common electrode of the LC element DE1. The color filter layer CFR1 is a color filter layer for the LC element DE1 and is a red color filter. The substrate 522 is provided with color filter layers corresponding to the colors of the subpixels 10. Here, red, green, and blue color filter layers are arranged in a stripe pattern. The light-blocking layer BMF1 shields a region that does not contribute to display, from light. The GDs 531 and 532 are covered with the light-blocking layer BMF1. In the pixel portion 530, the light-blocking layer BMF1 blocks light between adjacent pixel electrodes (the conductive layers 620 and 623). That is, in the plan view of the pixel portion 530, the light-blocking layer BMF1 has a grid pattern overlapped by the wirings SL1, SL2, and GL1.

<Common Contact Portion 536 and Terminal Portion 534>

The terminal TP1 includes the conductive layers 611, 621, and 638. The conductive layer 637 and the conductive layer 611 are electrically connected through the conductive layer 621. The terminal TP2 includes the conductive layers 612, 622, and 638. The conductive layer 638 and the conductive layer 612 are electrically connected through the conductive layer 622. The conductive layer 657 forms a lead wiring. In the example of FIG. 25, the terminal TP1 and the terminal TP2 are electrically connected through the conductive layer 657.

Note that the conductive layers 638 and 639 are provided as appropriate. When the conductive layers 638 and 639 are not provided, the conductive layers 621 and 622 are electrically connected directly to the conductive layer 657. Moreover, the lead wiring may be formed using the conductive layer 637 instead of the conductive layer 657. In this case, the conductive layer 638 is not provided in the terminal TP2, and the conductive layer 637 and the conductive layer 622 are electrically connected to each other directly.

The sealant 523 includes conductive particles 793. The liquid crystal layer 580 is sealed by formation of the sealant 523 including the conductive particles 793; thus, the conductive layer 740 can be electrically connected to the terminal TP1 in the common contact portion 536. Note that the conductive particles 793 may be distributed in the sealant 523 only in and around the common contact portion 536. The FPC 544 is electrically connected to the terminal TP2 through an anisotropic conductive film (ACF) 564 including conductive particles 794. That is, the common electrode (the conductive layer 740) provided over the substrate 522 is electrically connected to the FPC 544 through the terminal TP1, the lead wiring (the conductive layer 754), and the terminal TP2.

The display principles of the display module 500 are similar to those of the display module 150 (FIG. 3). As illustrated in FIG. 24, external light 760 that enters from the substrate 522 passes through the color filter layer CFR1, the conductive layer 740, the liquid crystal layer 580, and the like and is reflected by the conductive layer 620. Light 761 reflected by the conductive layer 620 passes through the liquid crystal layer 580, the conductive layer 740, the color filter layer CFR1, and the like again and is emitted from the substrate 522. Light 762 from the EL element DE2 is reflected by the conductive layer 682, transmitted through the conductive layer 680, the color filter layer CFR2, the opening 620a in the conductive layer 620, the color filter layer CFR1, and the like, and emitted from the substrate 522.

Each of the layers included in the display panel 510 may have a single-layer structure or a stacked structure.

Examples of conductive materials used for the conductive layers include metals such as aluminum, chromium, copper, silver, gold, platinum, tantalum, nickel, titanium, molybdenum, tungsten, hafnium, vanadium, niobium, manganese, magnesium, zirconium, and beryllium, and alloys and compounds of such metals. Other examples are polycrystalline silicon containing an impurity element such as phosphorus, and a light-transmitting conductor containing a metal oxide. Examples of light-transmitting conductors include metal oxides such as indium oxide containing tungsten oxide, indium zinc oxide containing tungsten oxide, indium oxide containing titanium oxide, indium tin oxide containing titanium oxide, indium tin oxide (referred to as ITO), indium zinc oxide, and indium tin oxide to which silicon oxide is added.

Examples of insulating materials used for the insulating layers in the display panel 510 include aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide. Another example is a resin material such as an acrylic resin, a polyimide resin, a benzocyclobutene-based resin, a siloxane-based resin, a polyamide resin, or an epoxy resin. Note that in this specification, an oxynitride refers to a compound that contains more oxygen than nitrogen, and a nitride oxide refers to a compound that contains more nitrogen than oxygen.

As has been described above, transistors with various structures can be provided in the transistor layer 581. Other structure examples of transistors in the transistor layer 581 will be shown below.

<<Transistors M21 and M22>>

Figure 26A:
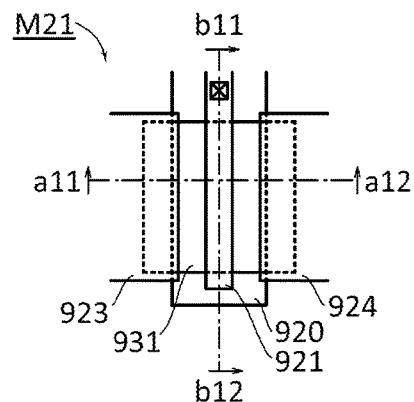
FIGS. 26A and 26B are plan views each illustrating a structure example of an OS transistor.
Figure 26B:
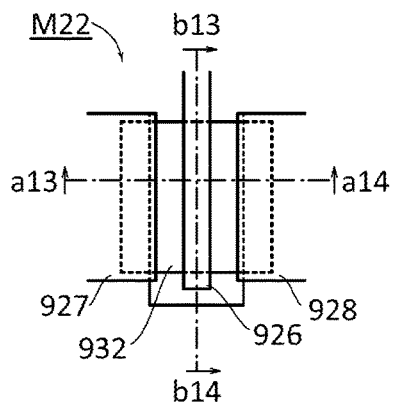
Figure 26C:
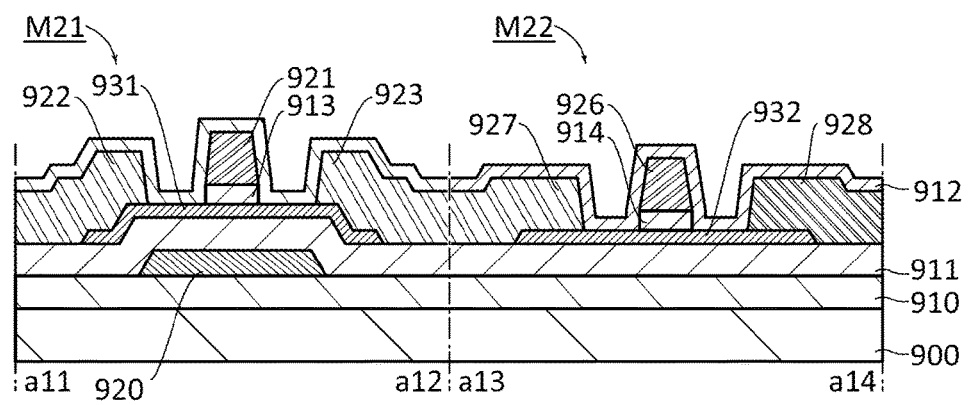
FIGS. 26C and 26D are cross-sectional views illustrating a structure example of the OS transistors.
Figure 26D:
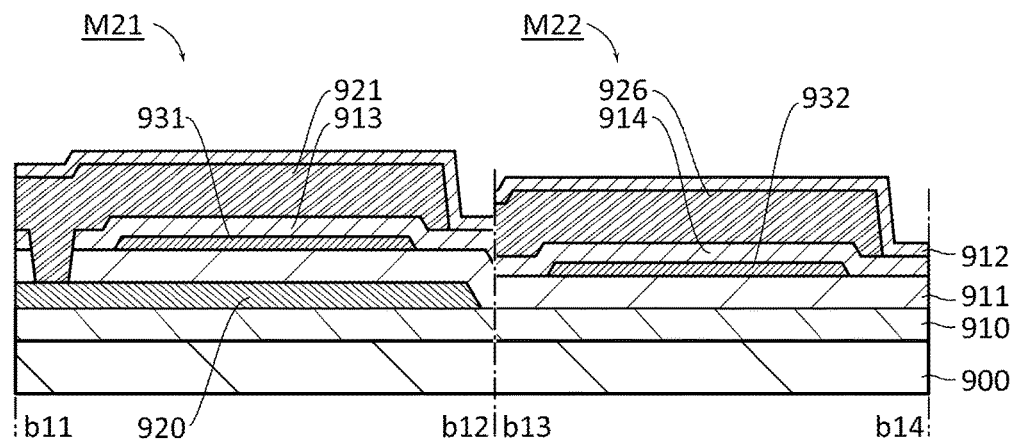

FIGS. 26A to 26D illustrate examples of the structure of a top-gate OS transistor. FIGS. 26A and 26B are top views of a transistor M21 and a transistor M22, respectively. FIG. 26C is a cross-sectional view of the transistors M21 and M22 in the channel length direction. FIG. 26D is a cross-sectional view of the transistors M21 and M22 in the channel width direction. FIG. 26C illustrates a cross section of the transistor M21 along the line a11-a12 and a cross section of the transistor M22 along the line a13-a14. FIG. 26D illustrates a cross section of the transistor M21 along the line b11-b12 and a cross section of the transistor M22 along the line b13-b14.

The transistors M21 and M22 are formed over a substrate 900 with an insulating layer 910 placed therebetween. The transistors M21 and M22 are covered with an insulating layer 912. The transistor M21 includes a gate insulating layer 913, a semiconductor layer 931, a backgate electrode 920, a gate electrode 921, a source electrode 922, and a drain electrode 923. The transistor M22 includes a gate insulating layer 914, a semiconductor layer 932, a gate electrode 926, a source electrode 927, and a drain electrode 928. An insulating layer 911 is provided to cover the backgate electrode 920. The semiconductor layers 931 and 932 are provided over the insulating layer 911. The semiconductor layers 931 and 932 are formed using a single oxide semiconductor film or a stack of oxide semiconductor films. The backgate electrode 920 is electrically connected to the gate electrode 921.

In the transistor M21, the gate electrode 921 does not have a region overlapping the source electrode 922 and the drain electrode 923. Thus, the parasitic capacitance of the gate electrode 921 of the transistor M21 can be decreased. The transistor M22 has a stacked structure similar to that of the transistor M21, so that the parasitic capacitance of the gate electrode 926 of the transistor M22 can be decreased as well. Considering that the parasitic capacitance of a gate electrode of a transistor causes signal delay, the transistors M21 and M22 are suitable for a pixel portion and a gate driver of a large-area display panel.

<<Transistors M23 and M24>>

Here, a structure example of a transistor in which a semiconductor layer is formed using silicon (Si transistor) will be shown. When the GDs 531 and 532 consist of Si transistors, they may be composed of n-channel transistors and p-channel transistors. Alternatively, all the transistors in the pixel portion 530 and the GDs 531 and 532 may be p-channel transistors.

Figure 27:
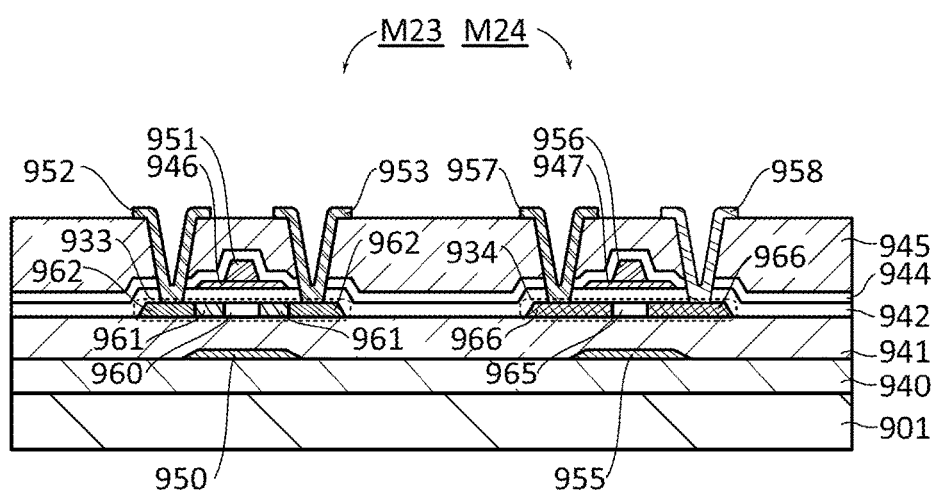
FIG. 27 is a cross-sectional view illustrating a structure example of transistors.

Transistors M23 and M24 illustrated in FIG. 27 are top-gate transistors. The transistor M23 is an n-channel transistor, and the transistor M24 is a p-channel transistor. Layers 940 to 947 are insulating layers. The transistors M23 and M24 are formed over the substrate 900 with the insulating layer 940 placed therebetween. The insulating layer 946 is a gate insulating layer of the transistor M23. The insulating layer 947 is a gate insulating layer of the transistor M24. The transistor M23 includes a semiconductor layer 933, a backgate electrode 950, a gate electrode 951, a source electrode 952, and a drain electrode 953. The transistor M24 includes a semiconductor layer 934, a backgate electrode 955, a gate electrode 956, a source electrode 957, and a drain electrode 958.

Over the substrate 901, the transistor M23 without the backgate electrode 950 can be provided as an n-channel transistor. Moreover, the transistor M24 without the backgate electrode 955 can be provided as a p-channel transistor.

The semiconductor layers 933 and 934 are formed using a silicon film. For example, the semiconductor layers 933 and 934 can be formed using amorphous silicon formed by a sputtering method or a vapor deposition method such as a plasma CVD method. Alternatively, polycrystalline silicon obtained by crystallization of such amorphous silicon by laser annealing or the like can be used. Further alternatively, a single crystal silicon layer obtained by separation of a surface portion by implantation of hydrogen ions or the like into a single crystal silicon wafer can be used.

Examples of a method for crystallizing a silicon film include laser crystallization using a laser beam, crystallization using a catalytic element, and a combination of these methods. When a substrate with high heat resistance, such as a quartz substrate, is used as the substrate 901, it is possible to combine any of the following crystallization methods: a thermal crystallization method with an electrically heated oven, a lamp anneal crystallization method with infrared light, a crystallization method with a catalytic element, and high temperature annealing at about 950° C.

The semiconductor layer 933 includes a channel formation region 960, a pair of light doped drain (LDD) regions 961, and a pair of impurity regions 962. The channel formation region 960 is a region where the semiconductor layer 933 is overlapped by the gate electrode 951. The pair of impurity regions 962 functions as a source region and a drain region. To impart n-type conductivity, an impurity element such as boron (B), aluminum (Al), or gallium (Ga) is added to the LDD regions 961 and the impurity regions 962. The semiconductor layer 934 includes a channel formation region 965 and a pair of impurity regions 966. The channel formation region 965 is a region where the semiconductor layer 934 is overlapped by the gate electrode 956. The pair of impurity regions 966 functions as a source region and a drain region. To impart p-type conductivity, an impurity element such as phosphorus (P) or arsenic (As) is added to the impurity regions 966.

This application is based on Japanese Patent Application serial no. 2015-188757 filed with Japan Patent Office on Sep. 25, 2015, the entire contents of which are hereby incorporated by reference.

What is claimed is:

1. A driver IC comprising a first output pin and a second output pin,
    wherein:
    the driver IC is configured to be input with a digital signal from the outside,
    data of the digital signal can comprise first data, second data, and third data,
    the driver IC is configured to generate a first analog data signal from an image signal input from the outside,
    the driver IC is configured to generate a second analog data signal from the image signal,
    the driver IC is configured to output the first analog data signal from the first output pin as an alternating-current voltage signal and output the second analog data signal from the second output pin as a direct-current voltage signal, when the data of the digital signal is the first data,
    the driver IC is configured to output the first analog data signal from the first output pin as an alternating-current voltage signal and output the second analog data signal from the second output pin as an alternating-current voltage signal, when the data of the digital signal is the second data, and
    the driver IC is configured to output the first analog data signal from the first output pin as a direct-current voltage signal and output the second analog data signal from the second output pin as a direct-current voltage signal, when the data of the digital signal is the third data.

2. The driver IC according to claim 1, wherein the image signal and the digital signal are differential signals.

3. A driver IC comprising:
    a first output pin;
    a second output pin;
    a logic circuit;
    a shift register;
    a latch circuit;
    a digital-to-analog converter circuit;
    a multiplexer; and
    an amplifier circuit,
    wherein:
    the logic circuit is configured to generate a first control signal, a second control signal, and a third control signal,
    the logic circuit is configured to generate a first digital data signal and a second digital data signal from an image signal input from the outside,
    the latch circuit is configured to latch the first digital data signal and the second digital data signal in accordance with an output signal of the shift register,
    the latch circuit is configured to output the first digital data signal and the second digital data signal in accordance with the first control signal,
    the digital-to-analog converter circuit is configured to generate a first pair of analog data signals comprising a positive signal and a negative signal, in accordance with data of the first digital data signal,
    the digital-to-analog converter circuit is configured to generate a second pair of analog data signals comprising a positive signal and a negative signal, in accordance with data of the second digital data signal,
    the multiplexer is configured to output one signal of the first pair of analog data signals to the amplifier circuit in accordance with data of the second control signal,
    the multiplexer is configured to output one signal of the second pair of analog data signals to the amplifier circuit in accordance with data of the third control signal,
    the amplifier circuit is configured to amplify the one signal of the first pair of analog data signals output from the multiplexer and output the amplified signal to the first output pin, and
    the amplifier circuit is configured to amplify the one signal of the second pair of analog data signals output from the multiplexer and output the amplified signal to the second output pin.

4. An electronic device comprising:
    a display panel; and
    a driver comprising one or a plurality of the driver ICs according to claim 3,
    wherein the driver is electrically connected to the display panel.

5. An electronic device comprising:
    a display panel;
    a driver comprising a driver IC configured to drive a source line and comprising an output pin;
    an illuminance sensor; and
    an image processor,
    wherein:
    the driver IC is configured to generate an analog data signal from an image signal input from the outside,
    the driver IC is configured to output the analog data signal from the output pin,
    the driver IC is configured to set whether the analog data signal output from the output pin is output as an alternating-current voltage signal or a direct-current voltage signal, in accordance with data of a digital signal input from the outside,
    the driver is electrically connected to the display panel,
    the image processor is configured to generate the image signal,
    the image processor is configured to determine gray level data of the image signal in accordance with a sensing signal of the illuminance sensor,
    the display panel comprises a plurality of subpixels, and
    each of the plurality of subpixels comprises a first display element to be driven with alternating current and a second display element to be driven with direct current.

6. An electronic device comprising:
    a display panel;
    a driver comprising one or a plurality of the driver ICs according to claim 1;
    an illuminance sensor; and
    an image processor,
    wherein:
    the driver is electrically connected to the display panel,
    the image processor is configured to generate the image signal, and
    the image processor is configured to determine gray level data of the image signal in accordance with a sensing signal of the illuminance sensor.

7. An electronic device comprising:
a display panel;
a driver comprising one or a plurality of the driver ICs according to claim 3;
an illuminance sensor; and
an image processor,
wherein:
the driver is electrically connected to the display panel,
the image processor is configured to generate the image signal, and
the image processor is configured to determine gray level data of the image signal in accordance with a sensing signal of the illuminance sensor.

8. The electronic device according to claim 6,
wherein the display panel comprises a plurality of subpixels, and
wherein each of the plurality of subpixels comprises a first display element to be driven with alternating current and a second display element to be driven with direct current.

9. The electronic device according to claim 7,
wherein the display panel comprises a plurality of subpixels, and
wherein each of the plurality of subpixels comprises a first display element to be driven with alternating current and a second display element to be driven with direct current.

10. The electronic device according to claim 5,
wherein:
the second display element to be driven with the direct current, a first transistor, and a second transistor,
the first transistor is electrically connected to the first display element,
the second transistor is electrically connected to the second display element, and
the first transistor and the second transistor are placed on one insulating surface.

11. The electronic device according to claim 6,
wherein:
the display panel comprises a plurality of subpixels,
each of the plurality of subpixels comprises a first display element to be driven with alternating current, a second display element to be driven with direct current, a first transistor, and a second transistor,
the first transistor is electrically connected to the first display element,
the second transistor is electrically connected to the second display element, and
the first transistor and the second transistor are placed on one insulating surface.

12. The electronic device according to claim 7,
wherein:
the display panel comprises a plurality of subpixels,
each of the plurality of subpixels comprises a first display element to be driven with alternating current, a second display element to be driven with direct current, a first transistor, and a second transistor,
the first transistor is electrically connected to the first display element,
the second transistor is electrically connected to the second display element, and
the first transistor and the second transistor are placed on one insulating surface.

13. The electronic device according to claim 12,
wherein a channel formation region of the first transistor comprises a metal oxide, and
wherein a channel formation region of the second transistor comprises a metal oxide.

14. The electronic device according to claim 5,
wherein the first display element is a liquid crystal element, and
wherein the second display element is an electroluminescent element.

15. The electronic device according to claim 8,
wherein the first display element is a liquid crystal element, and
wherein the second display element is an electroluminescent element.

16. The electronic device according to claim 9,
wherein the first display element is a liquid crystal element, and
wherein the second display element is an electroluminescent element.

* * * * *